Sept. 13, 1938.  L. S. HARRISON  2,129,762
RECORDER
Filed Jan. 31, 1934   9 Sheets-Sheet 1

INVENTOR
Lawrence S. Harrison
BY
ATTORNEY

Sept. 13, 1938.    L. S. HARRISON    2,129,762
RECORDER
Filed Jan. 31, 1934    9 Sheets-Sheet 2

INVENTOR
Laurance S. Harrison
BY
ATTORNEY

Sept. 13, 1938.　　　L. S. HARRISON　　　2,129,762
RECORDER
Filed Jan. 31, 1934　　　9 Sheets-Sheet 3

INVENTOR
Laurence S. Harrison
BY
ATTORNEY

Sept. 13, 1938. L. S. HARRISON 2,129,762
RECORDER
Filed Jan. 31, 1934 9 Sheets-Sheet 4

INVENTOR-
Laurence S. Harrison
BY
W. M. Wilson
ATTORNEY-

Sept. 13, 1938.　　　　L. S. HARRISON　　　　2,129,762
RECORDER
Filed Jan. 31, 1934　　　　9 Sheets-Sheet 5

INVENTOR-
Laurence S. Harrison
BY
ATTORNEY-

Sept. 13, 1938. L. S. HARRISON 2,129,762
RECORDER
Filed Jan. 31, 1934 9 Sheets-Sheet 6
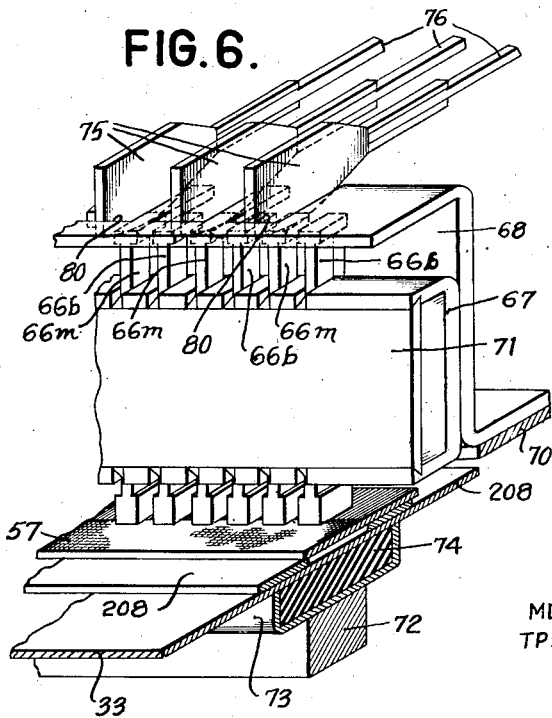
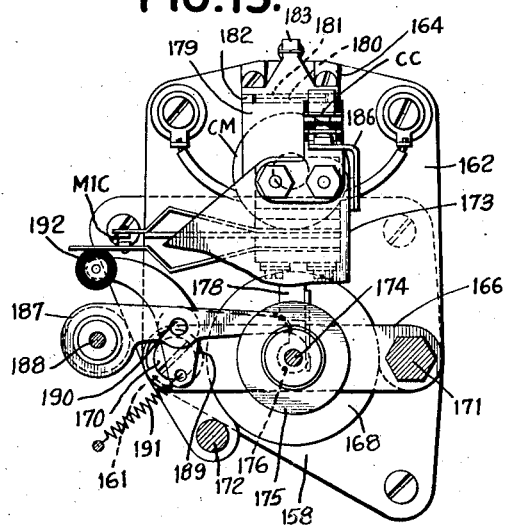
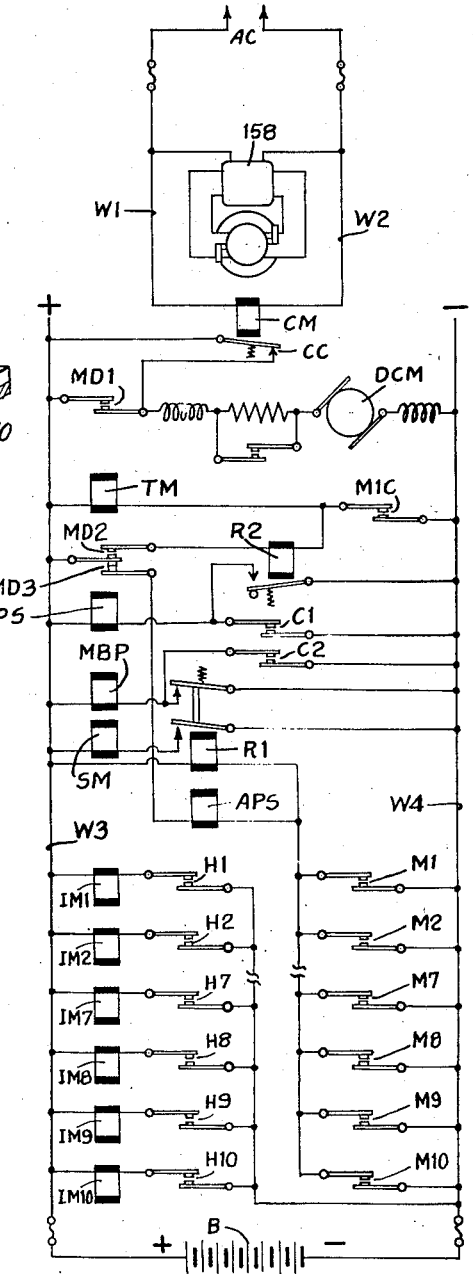
INVENTOR
Laurence S. Harrison
BY
W. M. Wilson
ATTORNEY Sept. 13, 1938.  L. S. HARRISON  2,129,762
RECORDER
Filed Jan. 31, 1934  9 Sheets-Sheet 7

INVENTOR
Laurence S. Harrison
BY
W. M. Wilson
ATTORNEY

Sept. 13, 1938.  L. S. HARRISON  2,129,762
RECORDER
Filed Jan. 31, 1934  9 Sheets-Sheet 8

INVENTOR-
Laurence S. Harrison
BY
ATTORNEY-

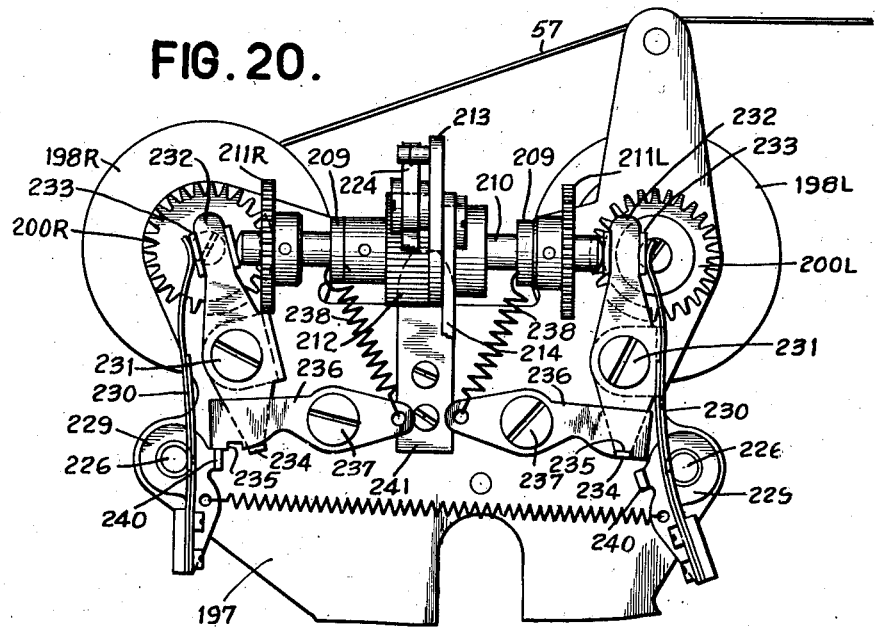
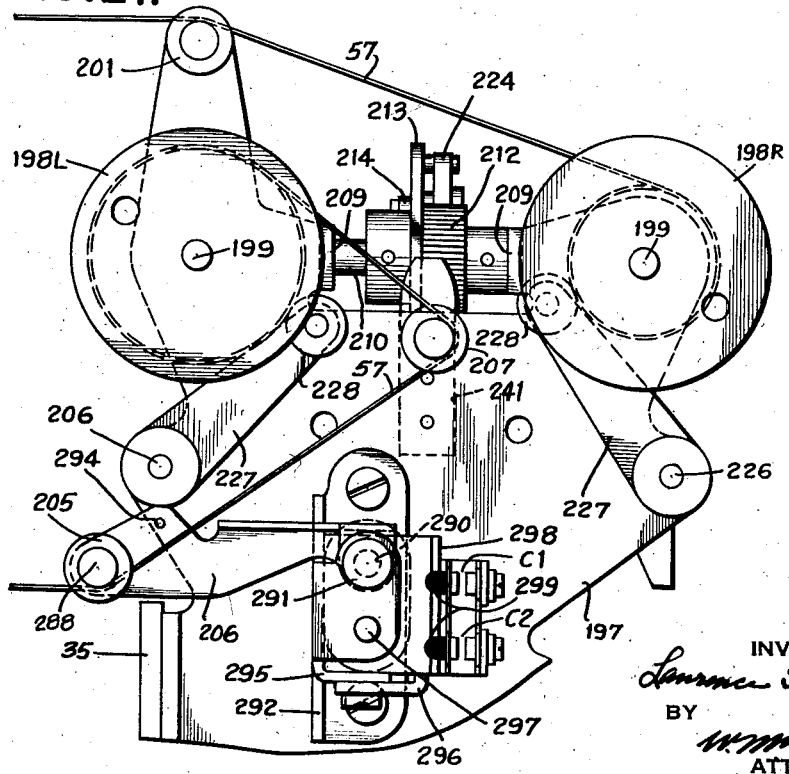

Patented Sept. 13, 1938

2,129,762

UNITED STATES PATENT OFFICE 2,129,762

RECORDER

Laurence S. Harrison, Binghamton, N. Y., assignor to International Business Machines Corporation, New York, N. Y., a corporation of New York Application January 31, 1934, Serial No. 709,138

20 Claims. (Cl. 234—1.5)

This invention relates to recorders in general, particularly the type using a chart.

The broad object of the invention is to provide a noval recorder suitable for recording transient phenomena of various kinds, such as the opening and closing of doors; the operation of circuit breakers, oil switches, generators, and other electrical apparatus and machines; the operation of machinery of all kinds, for instance, batteries of paper making machines, wire forming machines, rolling mills, and the like; and, in general, processing machines and apparatus of all kinds.

In brief, the broad object is to provide a recorder of the strip chart type which is capable of general use and adaptable to a large number of conditions where an accurate and reliable recorder is necessary.

Heretofore, it has been customary to feed the charts of recorders using strip charts at a constant speed so that distances measured along the length of the strip represent coordinates of time. In other words, the chart is constantly in motion. This type of construction is satisfactory and very essential in recording voltmeters, ammeters, wattmeters, thermometers, pyrometers, and the like where conditions are constantly changing but is not desirable in recorders for transient phenomena such as overloads, short circuits, and occasional severe line disturbances of electrical power systems; the starting and stopping of processing machines or apparatus of different kinds; locking or unlocking of doors and closing or opening of water or fireproof bulkheads, and a multitude of other operations which may take place at infrequent intervals of time or, at best, with a considerable lapse of time between successively occurring phenomena.

The main reason for the undesirability of a constant paper feed in recording transient phenomena like those outlined above is the large waste of chart paper which usually results. As an illustration, take a circuit breaker recorder using a strip chart, several forms of which have been developed. When these recorders are used in connection with electrical transmission systems and networks, it is usually true that, once the system or network has been started in full operation, and except for a few routine operations of circuit breakers and oil switches at prearranged times, changes in the status of the circuit breakers and oil switches occur only at very infrequent intervals of time and are caused mainly by transient line disturbances, short circuits, and unexpected overloads. This means that the chart paper may be fed for hours before any significant change in line or system conditions makes changes in the status of the system apparatus necessary. The actual amount of waste of chart is very difficult to determine accurately, but it is easily possible for wastage amounting to from 75% to 95% to occur. As the specially ruled charts are very expensive, the waste of this paper may amount to a considerable expense particularly when a large number of recorders are necessary.

Another undesirable feature of the constant feed of the chart is the large amount of space required for storage of the rolls of used charts which, for reasons obvious to those skilled in the art, must be preserved intact even when only a few parts of a roll are of interest. As the charts must, in a majority of cases, be kept for some time before being destroyed, the space required for their storage may be quite large.

One of the objects of the invention, therefore, is to provide a recorder for transient phenomena wherein the chart is fed a predetermined length at a constant rate of speed only when the phenomena to be recorded occurs.

Another object is to provide a recorder wherein the exact time is printed at least once on each predetermined length of chart fed in order to provide a convenient time reference point for determining the exact time of occurrence of all phenomena which may occur during the interval of time while the chart is being fed a predetermined distance.

A disadvantage of graphic recorders of present types is the difficulty of accurately determining the exact time when a change in conditions (such as voltage, current, temperature, or the like) occurs due to the fact that the chart is usually fed so slowly that measurements made with a scale cannot be expected to be much more accurate than to within a quarter of a minute of the correct time and to get such accuracy the chart must be fed fairly fast, say five or six inches per hour. As an example, one type of circuit breaker recorder has its chart fed constantly at the rate of three inches per hour. Obviously, it is not practical to rule a chart for such a recorder with lines closer than about 1/40" in which case the lines would be 30 seconds apart. An accuracy within one quarter of a minute but not much greater can be had from such a chart but there is a great waste of chart. If the chart feed is reduced for economy of chart the accuracy of measurements is greatly reduced while if the feed is increased to secure greater accuracy, a corresponding increase in waste results.

Accordingly, one of the objects of the present invention is to provide a recorder wherein the chart is normally at rest and is fed an appreciable amount at a constant rate in a short space of time only on the occurrence and under control of transient phenomena. At some point in this predetermined feed the exact time, say in hours and minutes, is stamped upon the chart thus enabling the exact time of phenomena to be readily ascertained by measurement.

The feed is of sufficient length and of long enough duration to enable the time of all phenomena occurring during the feed of the chart to be accurately determined either by means of suitable lines ruled on the chart or by a properly graduated rule. Great accuracy may thus be secured but at the same time economy of chart is secured. Any reasonable number of entries can be made on the predetermined length of chart and their time relation to each other accurately determined to within one second or even less by reference to the exact time stamped on the chart.

A further object is to provide means for recording on each predetermined length of chart a plurality of transient phenomena which may occur during the time the chart is being fed a predetermined length.

Another object is to provide means to automatically print adjacent the first recordal of transient phenomena on each predetermined length of chart a suitable special character, such as an arrow, for identifying the first recordal.

Still another object is to provide a chart feeding mechanism which is driven by a motor that is in operation and using current only during the intervals when the chart is being fed predetermined lengths.

There is another important disadvantage of former types of recorders which the present invention eliminates. The charts of former recorders have been fed almost invariably by means of spring-driven clocks and in some cases, it is believed, by alternating current motors of the well-known synchronous type now commonly used in electric clocks and timing devices of various kinds. When spring-driven clock movements are used, various difficulties may be experienced, one of the most annoying of which difficulties is poor time keeping characteristics of the spring-drive movements used for this purpose.

The heavy load placed on the clock movement by the chart drive mechanism affects the accuracy of the movement to some extent, as does the temperature of the switchboard room which may be quite high due to the presence of various kinds of heat producing apparatus. The necessity for compactness, combined with the requirement of sufficient power to feed the chart, make it difficult to construct a clock movement which is both cheap, accurate, and reliable. Obviously, the clock movements in recorders of the strip chart type must be very well constructed and carefully inspected and adjusted at frequent intervals to insure constant accuracy. Furthermore, attendants sometimes forget to wind the movement or wind it too tight and troubles result from both acts of carelessness.

The use of an alternating current synchronous motor clock movement in place of a spring driven clock movement results in compactness and fair time keeping properties as long as the load on the motor is constant but the accuracy of the motor driven movement is likely to be affected to some extent by variation in the load due to the gradual increase in size of the chart storage roll as the chart supply roll unwinds, particularly when friction tapes or belt devices are used to keep the chart taut, as is usually the case. Furthermore, an interruption in the supply of alternating current to the synchronous motor naturally will render the recorder useless.

Accordingly, an object is to provide a compact driving and timing mechanism for recorders which mechanism is very accurate, reliable, simple in construction, requires little adjustment or repair, and is capable of operation independently of the alternating current supply in an emergency.

Another object is to provide a novel control switch for attachment to each machine, device, or apparatus whose operations are to be recorded.

An object is to provide simple and efficient inking ribbon feeding mechanism suitable for recorders.

A further object is to provide a novel arrangement whereby the recorder is automatically operated each time the cabinet or case enclosing the recorder is removed for inspection, repair, replacement of the chart, or removal of a length of the chart, as at the end of a day, week, or month and the recorder is automatically operated when the case is replaced.

Another object is to provide means whereby the records made when the cabinet or casing is removed are in a color contrasting with the records made when the recorder is operating in the normal way.

Various other objects, advantages, and features of the invention will be mentioned in the following description and claims or will be apparent after a study of description, claims and drawings.

In the drawings:

Fig. 6 is a perspective view of certain of the printing elements.

Fig. 7 is a circuit diagram.

Fig. 13 is a large scale front view of the synchronous motor.

Fig. 20 is a large scale rear elevation of the mechanism for automatically feeding the inking ribbon.

Fig. 21 is a large scale front elevation of the mechanism for feeding the inking ribbon.

Figure 1:
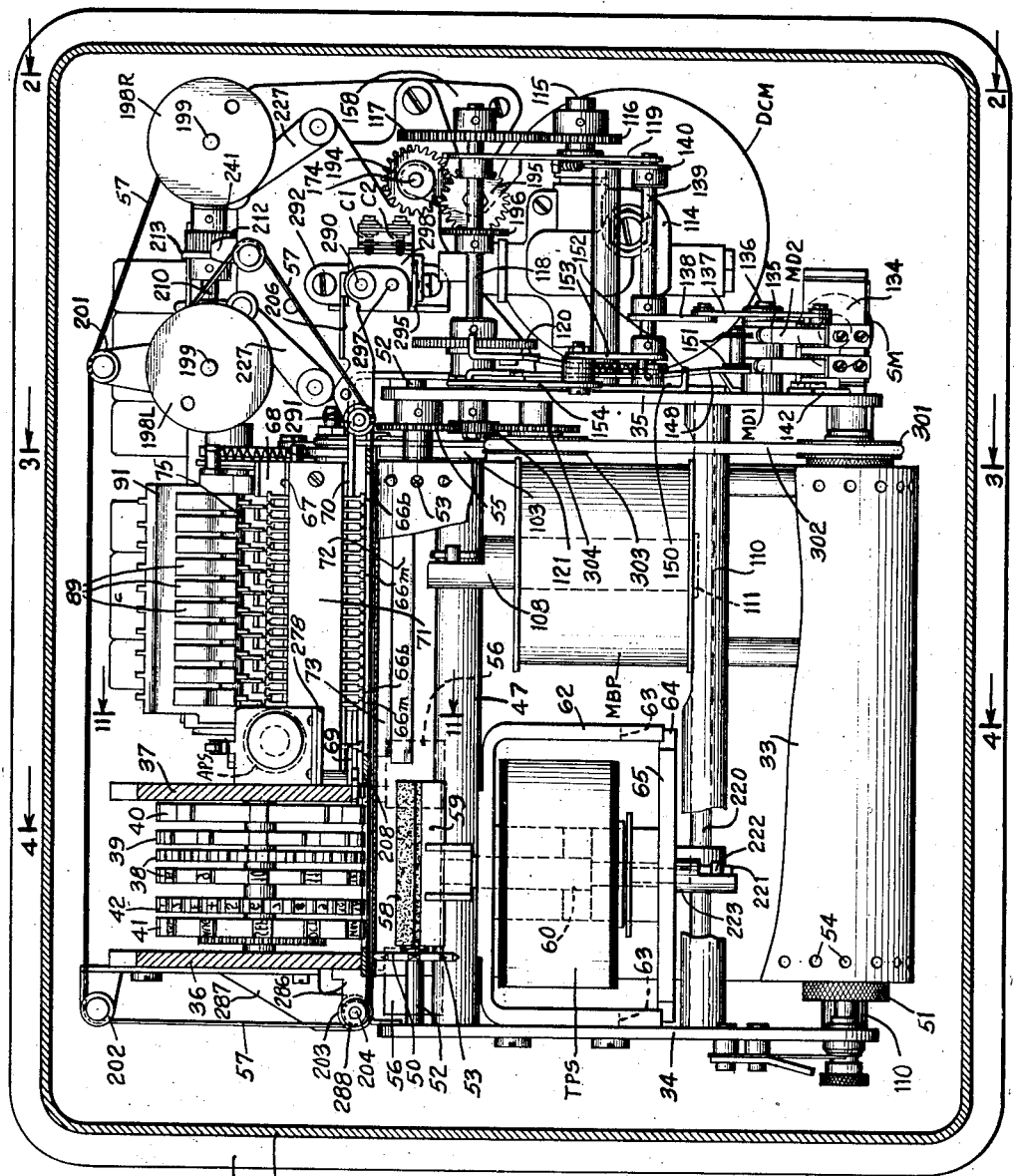
Fig. 1 is a front elevation of the recorder with the enclosing case shown in section.
Figure 8:
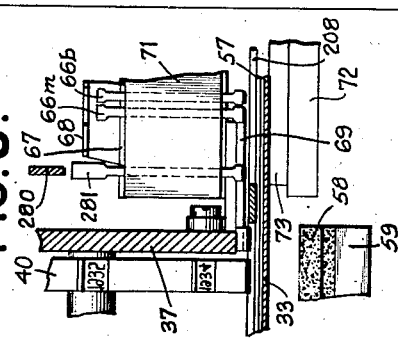
Fig. 8 is a large scale view in elevation of one of the arrow printing devices.

Figs. 1 to 4 are a series of general views showing the parts of the recorder in their normal positions. The recorder is shown in these views as having a rectangular mounting plate 30 by means of which the recorder may be secured to a wall or a switchboard panel. A suitable dust proof cabinet or case 31, removably attached to the plate 30, encloses the working parts and has one or more glass panels 32 which permit visual inspection of the chart 33 and the working parts of the recorder without removing the case 31.

Mounted on the plate 30 are two parallel frame plates 34, 35 which support most of the mechanism of the recorder, either directly or through suitable brackets or sub-frames carried by said plates 34, 35. Two frames 36, 37 support a time stamp printing head which is substantially the same as the one described in Letters Patent No. 1,798,583 granted March 31, 1931 to L. C. Bishop and A. L. Sprecker. As this printing head is now well known in the art and fully described in the above patent, no detailed description of its construction and operation need be given herein. It will be sufficient to remark that a magnet TM (Figs. 4 and 7) actuates time printing type wheels 38 (Figs. 1 and 4) which print the hour and minute. The letters AM or PM are printed by a type wheel 39, the year by a type wheel 40, while the month and day are printed by type wheels 41, 42, respectively. The magnet TM receives regular impulses of current occurring once each minute and transmitted by means to be described later. The magnet TM also drives the hands 43 which, with a suitable clock dial, indicate the time visually through glass panel 32.

Figure 3:
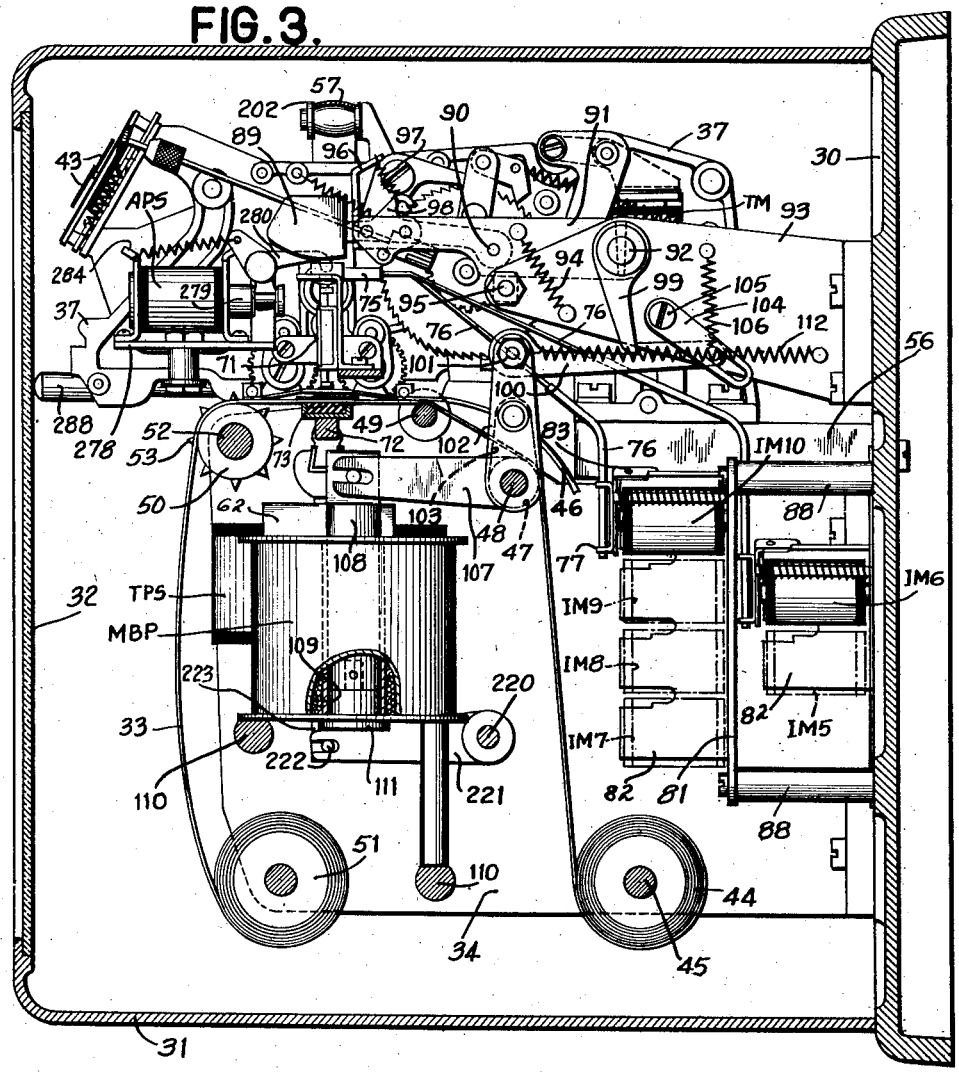
Fig. 3 is a vertical section on line 3—3 in Fig. 1.
Figure 4:
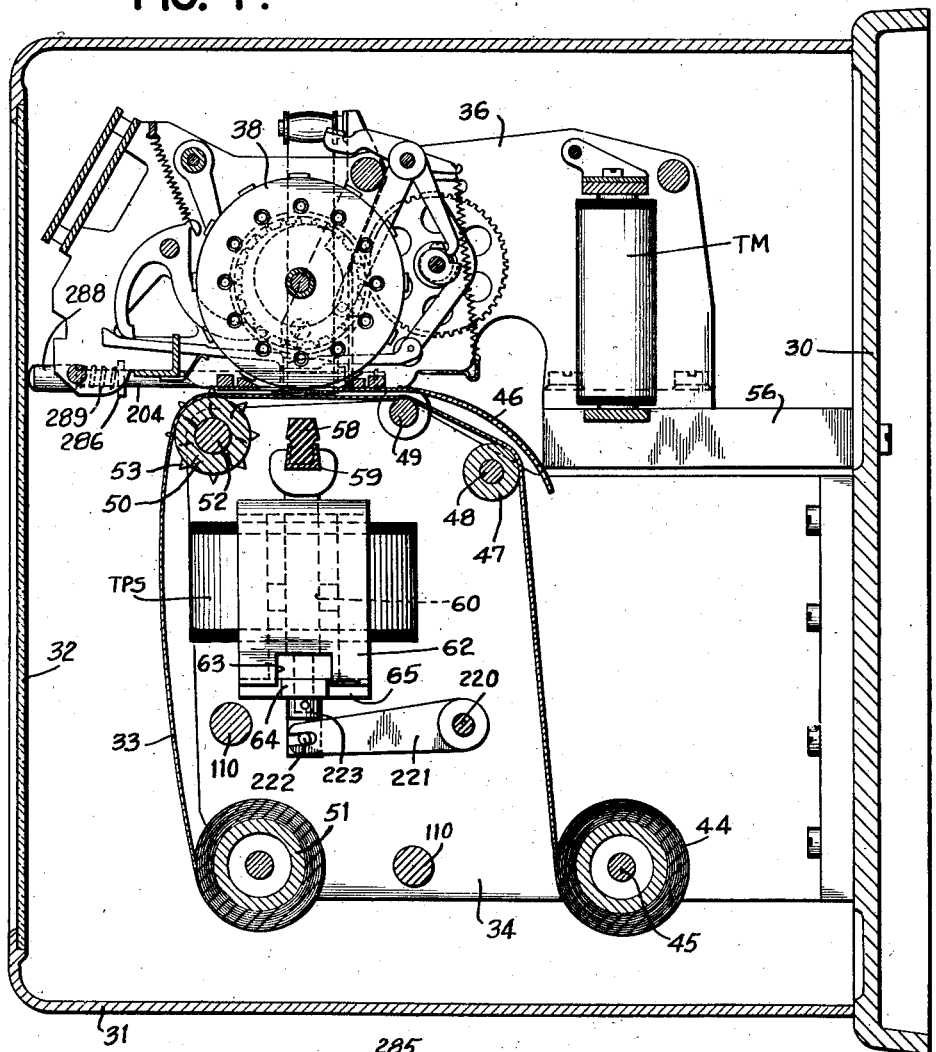
Fig. 4 is a vertical section on line 4—4 in Fig. 1.

The strip chart 33 is unwound from a supply spool 44 loosely mounted on a shaft 45 journalled in the plates 34, 35 (Figs. 3 and 4). This shaft 45 is removably mounted to permit new rolls of chart to be inserted as needed. The strip chart 33 passes upwardly beneath a paper guide plate 46 and over a sleeve or roller 47 (Fig. 4) on a cross shaft 48 carried by plates 34, 35; over a cross shaft 49 also supported by said frames; forwardly over a feed drum 50; and thence downwardly to the storage spool 51. The feed drum 50 is secured to a shaft 52 (Figs. 1, 3, and 4) which is journalled in frames 34, 35 and said drum has at its ends suitable sprockets 53 engaging holes 54 in the edges of the strip chart 33. Secured to the right-hand end of shaft 52 (Fig. 1) is a gear 55 by means of which shaft 52 and drum 50 may be rotated to feed the strip chart.

The frames 36, 37 which support the printing wheels 38 to 42 are mounted on rectangular blocks 56 (Fig. 4) secured to plate 30, and overhang the left half of the strip chart 33 (Fig. 1) which passes between an inking ribbon 57 and a platen 58 of resilient material. The platen 58 is carried by a cross bar 59 channel shaped in section (Fig. 4) and affixed to the upper end of the plunger 60 of a solenoid TPS, hereinafter to be termed the "time printing solenoid." The latter has a U-shaped field piece 62 (Fig. 1) secured to the right hand side of frame 34. Both legs of field piece 62 are slotted as at 63 (Fig. 4) to guide tongues 64 in a rectangular plate 65 secured to the lower end of the plunger 60. By this construction the plunger 60, which is circular in cross section is prevented from rotating yet is free to move vertically a limited amount. Solenoid TPS is energized by means hereinafter to be described and when this occurs the platen 58 is propelled rapidly upward (Figs. 1 and 4) to force the left-hand half of the strip chart against the printing wheels 38 to 52 of the time stamp printing head thus printing on the chart, the month, day, year, and time in hours and minutes.

The records of operation of circuit breakers, processing machines, and the like are made by a bank of type elements to the right of the type wheels 38 to 42 and in alignment with those type faces of said type wheels which confront the platen 58. Each machine or device whose operations are to be recorded has associated therewith a pair of type elements 66m and 66b, there being in the illustrative embodiment of the invention, ten pairs of type elements, or a total of twenty elements.

The ten pairs of type elements 66m, 66b are vertically slidable in slots cut in a frame 67 (Fig. 6) secured to a frame 68 whose left-hand end (Fig. 1) is supported by a bracket 69 secured to frame 37 and whose right-hand end is supported by a bracket 70 secured to plate 35. A plate 71 mounted in grooves in frame 67 holds the row of type elements 66m, 66b in the frame 67 but permits them to be depressed against the tension of suitable springs (not shown in Fig. 6) within the box-like frame formed by plate 71 and frame 67.

The type elements 66m have "M" types on their lower ends while the type elements 66b are similarly provided with "B" types. These letters, in the illustrative embodiment of the invention represent the words "make" and "break", respectively. Obviously each pair of type elements can be provided with other suitable letter type such as "S" for "start" and "F" for "finish", "O" for "open" and "C" for "closed", and so on, to suit the purpose for which the recorder is being used. For convenience in description it may be assumed that each pair of type elements 66m, 66b is associated with a circuit breaker or oil switch in an electric power system and that the pairs of type elements are numbered 1 to 10 from left to right (Fig. 1) to correspond with the ten vertically ruled columns in the right-hand half of the strip chart 33 in Fig. 5.

Mounted on the left-hand side of plate 35 and extending horizontally to the left (Fig. 1) beneath all the type elements 66m, 66b is a bar 72 provided on its upper side with a channel shaped member 73 carrying a strip 74 of resilient material forming a platen (see Fig. 6). The right-hand half of the strip chart 33 passes over the platen 74 and beneath the inking ribbon 57 which, of course, is interposed between the faces of the types in elements 66m, 66b and the strip chart 33. Thus movement of any selected type element of a pair 66m, 66b downwardly (Fig. 6) will cause the chart 33 to be imprinted in the column corresponding to the selected type element.

The type elements 66m, 66b of the different pairs are selected for operation by means of ten interposers 75 having the general shape shown in Fig. 6. Each interposer is associated with a pair of type elements 66m, 66b and is secured to the end of a bent rod or bar 76 extending rearwardly (to the right in Fig. 3) and downwardly in said figure into holes in a bracket 77. The brackets 77 are secured to the armatures 78 of interposer magnets designated IM5, IM6, IM7, and so on in Fig. 3. The rods 76 are secured to the brackets 77, the horizontal parts secured to interposers 75 and the vertical parts secured to brackets 77 making angles of substantially 90°, so that the attraction of an armature 78 by its interposer magnet causes the corresponding interposer 75 to swing horizontally to the right (Figs. 1 and 6). Normally the interposers 75 overlie the heads of the type elements 66m as shown in Figs. 1 and 6 but, when swung as described, move to a position over the heads of the type elements 66b. In other words, energization of any selected interposer magnet causes its interposer 75 to swing to the right (Fig. 6) from a position over the type element 66m of the pair associated with the selected magnet to a position over the type element 66b of the same pair. The interposers 75 are guided and restricted in their movements by notches or slots 80 formed in the frame 68 as shown in Fig. 6. The rods 76 are sufficiently resilient to permit the interposers 75 to be moved downwardly a slight amount by hammer mechanism presently to be described.

Figure 10:
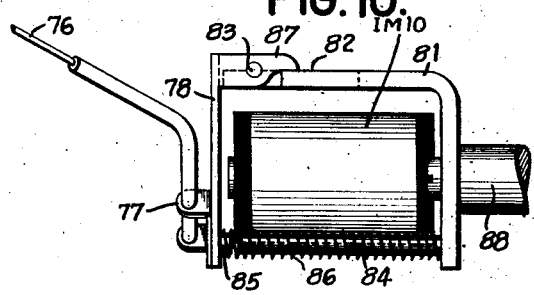
Fig. 10 is an end view of one of the frames carrying the interposer magnets.

The magnets are arranged in three groups for sake of compactness, two groups (magnets IM1 to IM4 and IM7 to IM10) having four magnets and one group (IM5, IM6) having only two magnets. Only two groups are shown in Fig. 3 and of these only one magnet of each group is shown. The interposer magnets of the left-hand group in Fig. 3 are secured to a frame 81 which is L-shaped in transverse section or as viewed from the upper end (Fig. 10) and slotted to form four posts or tongues 82 to which are pivoted the armatures 78 by means of a rod or wire 83 secured in grooves cut in tongues 82.

Associated with each interposer magnet and secured to frame 81 is a post 84 opposite a short pin 85 on the adjacent armature 78, which post 84 acts as a stop for armature 78 and also guides a spring 86 normally tending to hold armature 78 away from the pole of its magnet. One of the ears 87 by means of which each armature 78 is pivoted on wire 83 is extended to the right (Fig. 10) to one side of the adjacent tongue 82 and acts as a stop to prevent armature 78 from moving too far away from the pole of magnet 79. The frame 81 is mounted on posts 88 secured to frame plate 30. The other group of four magnets (IM1 to IM4) is similarly constructed and mounted behind the group of four magnets IM7 to IM10 designated in Fig. 3. The group of two interposer magnets IM5, IM6 designated in Fig. 3 is similarly constructed but its frame 81 is mounted directly on the frame plate 30.

The interposer magnets are individual to the machines, devices, or apparatus whose operations are to be recorded. Thus, in the case of the illustrative embodiment of the invention there is an interposer magnet corresponding to each circuit breaker and consequently a pair of type elements 66m, 66b associated with each magnet and its circuit breaker. The manner in which the interposer magnets IM1 to IM10 are selected for operation will be explained in detail later herein.

The hammer mechanism is best shown in Figs. 1 and 3. Associated with each pair of type elements 66m, 66b and their interposer, is a printing hammer 89. Hammers 89 are pivoted on a cross rod 90 carried by the arms of a bail 91 which is fixed to a shaft 92 journalled in frames 93 mounted on frame plate 30. A spring 94, anchored to pins carried by bail 91 and frame 93 normally holds the arms of bail 91 down against a rod 95 carried by frames 93.

The cross bar of bail 91 has slots open at the bottom to form a comb guiding the hammers 89 and has rearwardly and upwardly extending lugs 96 to which are secured springs 97 anchored to ears 98 formed in the hammers 89. The springs 97 normally hold the hammers 89 up against the bail 91 and out of contact with the interposers 75. Each hammer 89 is wide enough to strike the associated interposer 75 when the latter is in either of its two possible positions.

Secured to shaft 92 is an arm 99 projecting downwardly into engagement with a shoulder in a link 100 pivoted at 101 to an arm 102 on shaft 48. The arm 102 is secured to an arm 103 fixed to shaft 48. The right-hand end of link 100 has a pin extending into a slot formed in an arm 104 pivoted at 105 to frame 93. A spring 106 interposed between the pin just mentioned and a pin on frame 93 normally holds said pin in the upper end of the slot in arm 104 as in Fig. 3. An arm 107 secured to shaft 48, has a pin and slot connection to the plunger 108 of a solenoid MPB, hereinafter to be termed the "make and break printing solenoid." Plunger 108 is as usual in solenoids of this type freely movable in a tube 109 surrounded by the coil of the solenoid MPB. The latter is of the iron clad type and is supported on two cross rods 110 extending between plates 34, 35. Secured to the lower end of plunger 108 is a flanged stop 111 of non-magnetic material which stop limits upward movement of plunger 108 caused by a spring 112 attached to arm 102 and a stud carried by frame 93.

When solenoid MBP is energized in a manner hereinafter to be described, plunger 108 is drawn downwardly, rocking shaft 48 counterclockwise (Fig. 3) and causing link 100 to be drawn to the left in said figure. Arm 99, shaft 92, and bail 91 are rocked clockwise as a unit by the cooperation of link 100 and arm 99, raising the printing hammers 89, spring 94 being tensioned as the bail 91 rises. As link 100 moves to the left, link 104, cooperating with the pin on link 100, gradually forces the right-hand end of link 100 downwardly until finally the shoulder on said link becomes disengaged from arm 99.

Bail 91 is now drawn downward rapidly by spring 94 until said bail strikes cross rod 95. The momentum of the heads of printing hammers 89, however, causes the latter to move below their normal position of Fig. 3, against the tension of springs 97, and strike the interposers 75 percussively. Downward movement is thus imparted to the type elements 66, 66b underneath the interposers causing said type elements to print on the chart. The springs 97 then restore the printing hammers 89 to the position of Fig. 3. Deenergization of the solenoid MBP causes springs 106, 112 to restore the parts connected to said springs and link 100 to the positions shown in Fig. 3.

Figures 5, 12:
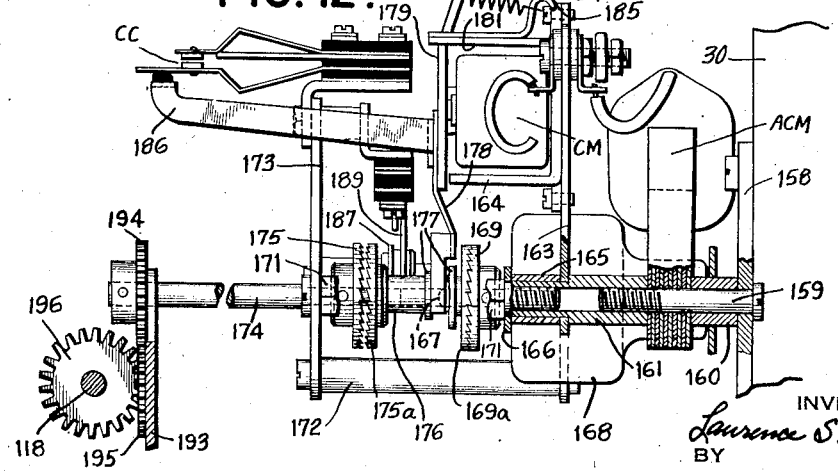
Fig. 5 is a view of two fragments of the chart.
Fig. 12 is a large scale side elevation of the synchronous motor and its connections.

It is evident that ten type elements 66m, 66b will be operated each time solenoid 109 is energized and will print a row of letters transversely of the left half of the strip chart as in the case of the lowest row in Fig. 5. The printing of the letter "M" in any of the numbered vertical columns of Fig. 5 signifies that the circuit breakers or oil switches corresponding to such columns were closed by the operations which caused the printing operation, while the presence of the letter "B" in any column means that the corresponding circuit breaker or oil switch was opened.

The mechanism for feeding a predetermined length of strip chart in a predetermined length of time will now be described in detail. This mechanism is best illustrated in Figs. 1, 2, 14, 15, 16, and 17.

The chart feeding mechanism is driven by a motor DCM which is operated by direct current and is designed to operate at a constant speed. The motor, by itself, forms no part of the present invention and need not be described in detail herein. It will be sufficient to state that it has been especially designed for use in clocks or timing devices where the speed must be as near constant as possible and has a negligible acceleration period before it reaches full speed, attaining full speed in a small fraction of a second. It is mounted on the right hand side of plate 35 and has, as an integral part thereof, a gear casing 114 containing suitable reduction gears which turn in a bath of oil.

A short shaft 115 extends horizontally from the gear casing 114 in a direction transverse of the longitudinal axis of the motor. The reduction gearing is so designed that shaft 115 turns at a uniform rate of two revolutions per minute.

The shaft 115 carries a pinion 116 meshing with a gear 117 having twice the diameter of said pinion so that a shaft 118 to which gear 117 is secured will be driven at the rate of one revolution per minute when the motor DCM is in operation. Shaft 118 is journalled in a plate 35 and in a sub-frame 119 secured to plate 35 and extends to the left (Fig. 1) beyond gear 55 on the shaft 52 carrying the drum 50. Secured to shaft 118 is a ratchet wheel 120 which is part of a clutch mechanism for coupling the shaft 118 to a pinion 121 which meshes with gear 55. The pinion 121 (see Fig. 17) is secured to a sleeve 122 which is loose on shaft 118 and extends through frame 35 to the side of ratchet wheel 120.

Figure 15:
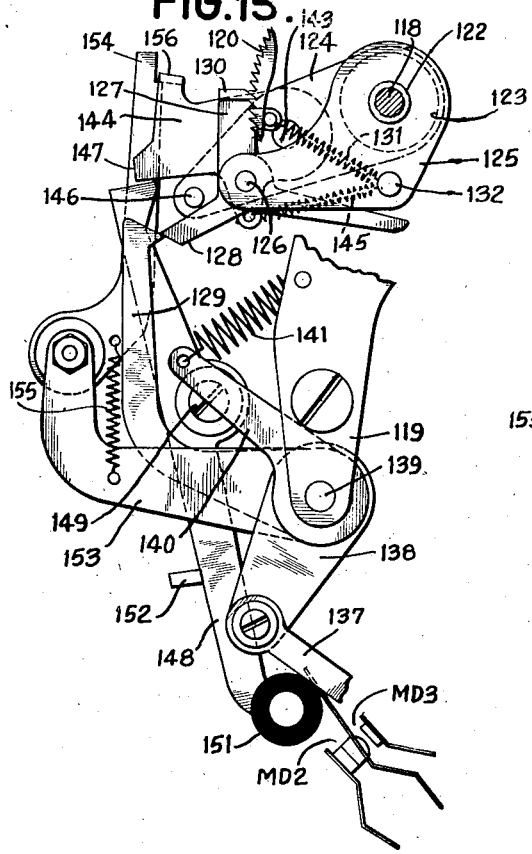
Fig. 15 is a view similar to Fig. 14 but shows the clutch and related parts in operated position.
Figure 16:
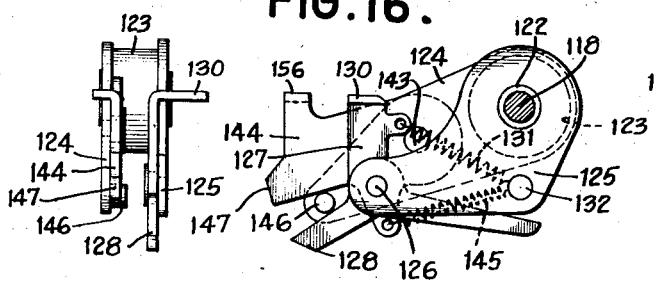
Fig. 16 is a large scale detail view of the assembly including the clutch dog and contact trip dog.
Figure 17:
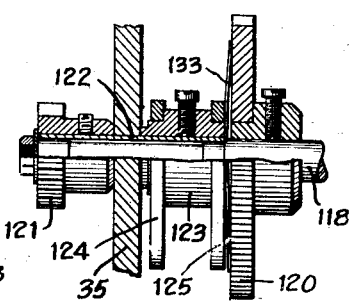
Fig. 17 is a vertical section in the line 17—17 in Fig. 14.

Adjacent ratchet wheel 120 a hub 123 is fixed to sleeve 122 and secured to this hub are two arms 124, 125 (Fig. 16). Pivoted at 126 to the arm 125 is a three arm lever or clutch dog 127 one of whose arms 128 normally engages a hook formed in an arm 129 (Fig. 14) in which position a bent over bevelled lug 130 on one arm of dog 127 is clear of the teeth in the ratchet wheel. A spring 131, interposed between a pin 132 on arm 125 and an ear in one arm of dog 127, tends to rock dog 127 clockwise but such action is normally prevented by the hook in arm 129. When the latter is rocked counterclockwise (Fig. 14) to the position of Fig. 15, the spring 131 will draw the lug 130 of dog 127 into engagement with the teeth in ratchet wheel 120 thereby coupling arm 125 and sleeve 122 to the ratchet wheel 120 and shaft 118. If now the motor DCM is started, the drum 50 will be rotated by shaft 118 through gear 55, pinion 121, sleeve 122, arm 125, dog 127, and ratchet 120.

Figure 14:
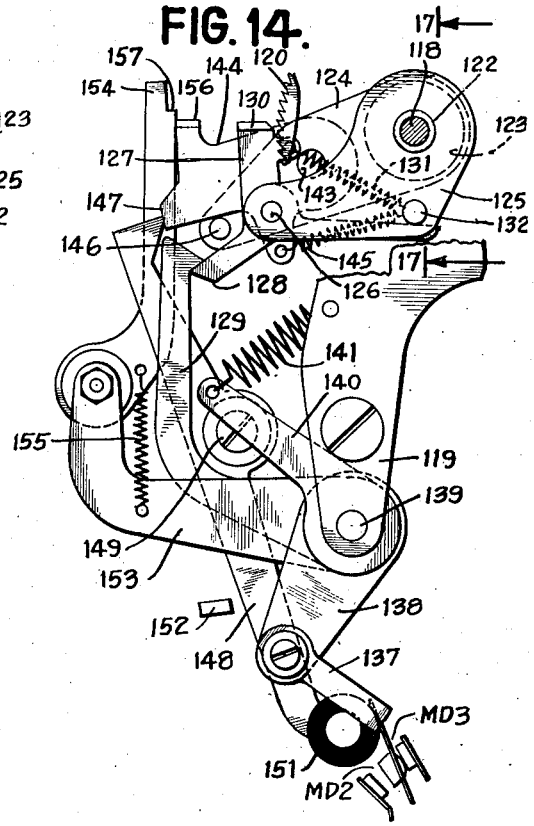
Fig. 14 is a large scale side elevation of the driving clutch for the chart feed mechanism and certain associated parts and shows the parts in normal position.

Near the end of a full revolution of arm 125, the arm 128 will reengage the hook in lever 129 and be rocked counterclockwise back to the position of Fig. 14 whereby to disengage lug 130 from the ratchet. Thus, a single revolution is imparted to sleeve 122 and pinion 121 and drum 50 is turned a half revolution. In the illustrative embodiment of the invention a half revolution of drum 50 feeds the strip chart a distance of exactly one and one-half inches. Since shaft 118 revolves at a constant speed of one revolution per minute, it is obvious that the strip chart will be fed at the rate of one and one-half inches per minute or 1/40 inch per second.

A friction spring or washer 133 (Fig. 17) is interposed between arm 125 and ratchet 120. The purpose of this element is to ensure reliable operation of the clutch mechanism and accurate feed of the chart when the dog 127 is approaching relatching position. The spring 131 also has a tendency to rock the lever 127 clockwise from the position of Fig. 14 and, if no means were provided to prevent such movement, the arms 124, 125, sleeve 122, and parts connected thereto, including the chart feed drum 50 might be reversely rotated enough to cause erroneously located imprints on the chart and consequently errors might be made in interpreting the entries on the chart.

The friction washer or spring 133 exerts sufficient pressure between arm 125 and ratchet 120 to prevent this reverse movement and also ensures that the arm 125 will move far enough as the motor DCM coasts to a stop, to carry the clutch lever arm 128 fully to latching position and complete the feed of the chart. At this point a long tail or arm of the lever 127 strikes the pin 132 and prevents the coasting of the motor from carrying the arm 125 beyond the normal latched position in Fig. 14. Thus shaft 118 cannot drive arm 124 and the chart drum either longer or less than one minute nor can spring 131 displace the parts after motor DCM has stopped.

The arm 129 is operated by a magnet SM which will be termed the "starting magnet" hereinafter as a matter of convenience. This magnet is secured to the right-hand side of plate 35 (Figs. 1 and 2) and actuates an armature 134 fixed to an arm 135 pivoted at 136 to frame 35. A link 137 is pivoted to arm 135 and to an arm 138 fixed to a shaft 139 journalled in frame 119 and plate 35. The arm 129 is secured to shaft 139 and obviously said arm will be rocked counterclockwise (Figs. 2 and 14) whenever starting magnet SM is energized in a manner hereinafter to be described. Also secured to the right-hand end of shaft 139 (Fig. 1) is an arm 140 to which is attached a spring 141 anchored in frame 119. This spring tends to rock arm 140, shaft 139, and arm 129 in a clockwise direction (Figs. 2 and 14) and thus normally holds arm 129 in latching engagement with arm 128 of lever 127.

Figure 2:
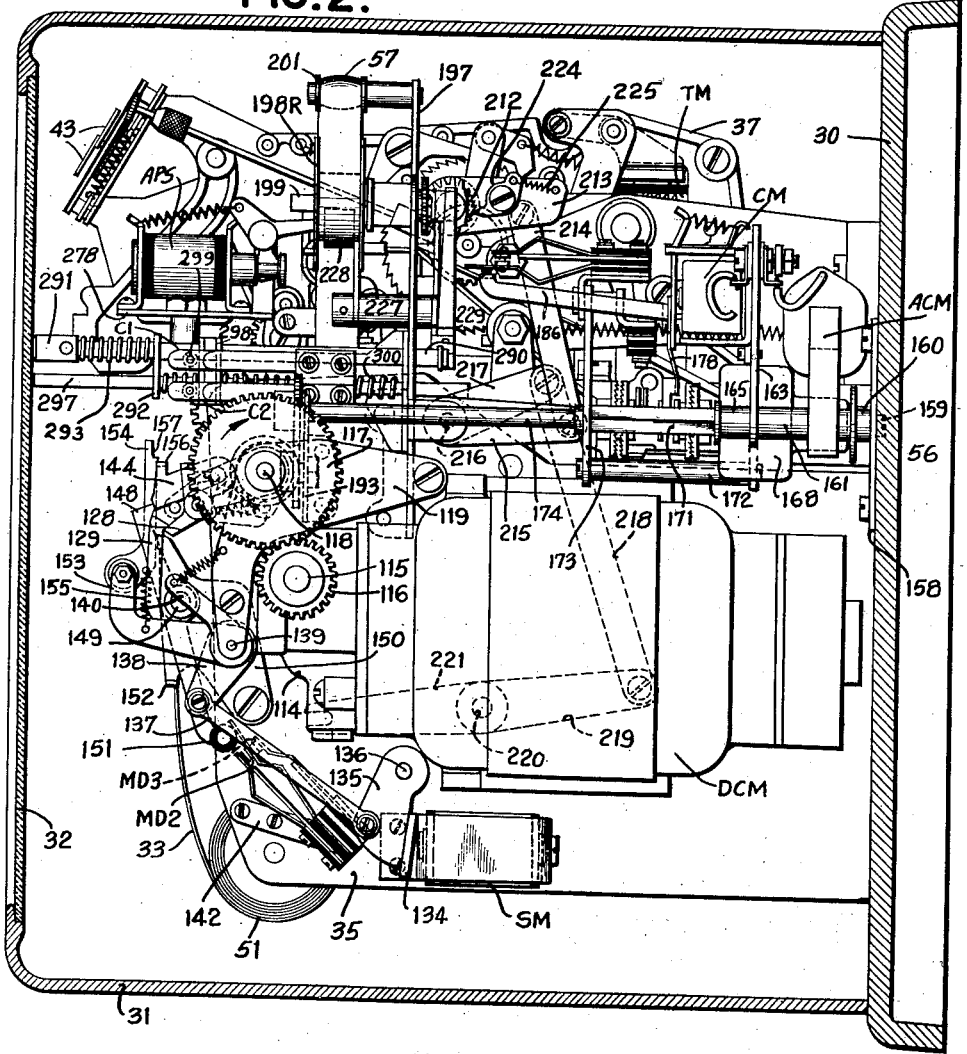
Fig. 2 is a vertical section on the line 2—2 in Fig. 1.

Magnet SM also controls certain contacts designated MD1, MD2, and MD3 (Figs. 1, 2 and 15) which, for convenience, may be called the "minute duration contacts" as they are held in operated position for exactly one minute while shaft 118 is turning to feed the strip chart 33. Contacts MD3 are normally closed while contacts MD1, MD2 are normally open. These contacts are carried by and insulated from a bracket 142 secured to plate 35 (Figs. 1 and 2). The arm 124 (Figs. 14, 15 and 16) has pivoted thereto at 143 a cam dog 144. A spring 145 anchored to pin 132 (which passes through both of the arms 124, 125) and to an ear in lever 144 tends to hold the cam lever 144 in the positions of Figs. 14 and 16 where a pin 146 limits counterclockwise movement of the cam dog in response to the spring 145. The cam dog 144 also has a cam lug 147 adapted to cooperate with a similar but reversed cam lug in the upper end of a lever 148 (Figs. 2, 14, 15 and 16) pivoted at 149 to a frame 150 secured to plate 35.

Normally the parts occupy the position of Fig. 14. In this position, a pair of insulating disks 151, secured to the lower end of lever 148 (Figs. 1, 2, and 14), engage the minute duration contacts MD1, MD2, MD3 in such fashion as to hold MD3 closed and MD1, MD2 open as in Fig. 2. When cam dog 144 is moved upwardly to the position of Fig. 15 so that cam lug 147 clears the cam lug in the end of lever 148, the latter will be permitted to rock slightly in a clockwise position by spring action of the minute duration contacts MD1, MD2, MD3 so that the first two close and the last opens as shown in Fig. 15. In this position of the parts a lug 152 on the front part of frame 150 engages lever 148 and limits its clockwise movement. The minute duration contacts are purposely made of thin resilient conducting material to permit the described action.

The cam dog 144 is moved upwardly when the armature 134 of magnet SM is released. Shaft 139 has an arm 153 secured thereto which arm curves forwardly to the left (Figs. 2, 14 and 15) and upwardly. A link 154 is pivoted to the arm 153 and is urged in a clockwise direction by a spring 155 anchored to arm 153. Normally link 154 bears lightly against a bent-over lug 156 formed in cam dog 144 with a notch or shoulder 157 formed in the upper end of said link just above the lug 156.

When magnet SM is energized shaft 139 and arm 153 are rocked counterclockwise (Fig. 14) drawing down link 154 a distance sufficient to bring shoulder 157 slightly below lug 156 thereby permitting the link 154 to rock slightly clockwise under the influence of spring 155 to bring shoulder 157 under said lug. This movement of link 154 is limited to the necessary degree by a projecting part of frame 150.

The subsequent deenergization of magnet SM permits spring 141 to restore the arm 153 to the position of Fig. 14 with the result that the link 154 rises and shoulder 157 engages lug 156 and lifts the latter rocking dog 144 clockwise to the position of Fig. 15 which movement of the dog is sufficient to move cam lug 147 up out of contact with the corresponding lug in lever 148. This action results in the operation of minute duration contacts MD1, MD2, MD3 as described.

The purpose of the construction just described is to secure extremely rapid operation of the contacts MD1, MD2, MD3 before the motor begins driving the chart. Obviously the minute duration contacts could be operated by a simple cam on shaft 118 but in such case a time delay would inevitably result as said shaft turns at such a slow rate that the chart would be fed for several seconds before the cam could become fully effective to operate the contacts. When the described construction is used the duration contacts MD1, MD2, MD3 are operated at the very beginning of the chart feed. Magnet SM is energized momentarily only and obviously the chart 33 begins to feed and the minute duration contacts are operated practically simultaneously. Near the end of each revolution of shaft 118 and arm 124, 125, the cam lug 147 reengages the corresponding lug in lever 148 and restores the minute duration contacts to their normal position of Fig. 14.

The magnet TM which actuates the type wheels 38 of the time stamp printing head is energized once each minute by a clock movement or timing unit which normally is driven by an alternating current motor of the synchronous type now commonly used in electric clocks. This motor is designated ACM in Figs. 2, 12 and 13 and is mounted on a plate 158 by means of screws like 159 (Fig. 12) which pass through the plate 158, sleeves like 160, the field frame of motor ACM and are threaded into shouldered sleeves 161. The plate 158 is screwed to plate 30.

The shoulders in sleeves 161 support a frame 162 which has mounted thereon a clutch magnet CM and its field piece 164. Spaced from frame 162 by means of sleeves 165 carried by the shoulders in sleeves 161 is a cross bar 166 which acts as a steadying support for the shaft 167 of motor ACM. This shaft projects from the gear casing 168 of the motor ACM and drives a toothed clutch element 169 fixed to said shaft. The cross bar 166 is secured to the left-hand sleeve 161 (Fig. 13) by means of a screw 170 and to the righthand sleeve 161 by means of a threaded stud 171 hexagonal in section screwed into the sleeve 161.

The stud 171, together with a cross rod 172 secured to a part of frame 162, together support a frame plate 173. The latter supports the rear end of a shaft 174 which is coaxial with shaft 167 and said plate also supports contacts designated CC which will be termed the "clutch contacts." Secured to the right-hand end of shaft 174 is a toothed clutch member 175 similar to clutch member 169. Jointly supported by the shafts 167, 174 between clutch members 169, 175 is an assembly comprising two toothed clutch members 169a, 175a coacting with clutch members 169, 175, respectively; a cam 176, and a grooved portion formed by two flanges 177. Normally clutch elements 169, 169a are kept in clutching engagement by means of a clutch shifter element 178 which extends into the groove formed by the flanges 177 and is secured to the free end of the armature 179 of magnet CM.

The armature 179 is pivoted on a knife edge 180 formed in the front end of the upper horizontal leg 181 of field piece 164, suitable lugs 182 in the leg 81 loosely projecting into notches cut in armature 179 to prevent the latter from being displaced from said knife edge. The upper end of armature 179 has a tongue 183 connected by a coil spring 184 to a bracket 185 secured to the leg 181. This spring normally has a tendency to rock armature 179 and shifter element 178 in a clockwise direction (Fig. 12) but energization of magnet CM normally prevents actual movement of the armature in response to said spring. The motor ACM and the magnet CM are in parallel across line wires W1, W2 leading to a source of alternating current AC (see Fig. 7) and normally the motor is running as in any electric clock. It is plain that as long as current is supplied to motor ACM it will drive the assembly including clutch element 169 and cam 176. The gearing in casing 168 and the synchronous speed of the motor ACM are so chosen that normally shaft 167 and hence cam 176 will rotate at a constant speed of one revolution per minute.

Secured to the armature 179 is an arm 186 which extends forwardly (to the left in Fig. 12) to a point underneath the lower contacts CC. When armature 179 is released by deenergization of magnet 163 caused by cessation of flow of the alternating current, an insulating button on arm 186 presses the lower contact CC into engagement with the upper contact. The clutch contacts CC are provided to close the circuit to the direct current motor DCM whenever the supply of alternating current is interrupted. The control effected by contacts CC will be explained more fully hereinafter.

The cam 176 operates contacts MIC (Fig. 13) which will be termed the "minute impulse contacts" since their function is to energize magnet TM of the time stamp printing head once each minute and also to control the imprinting of the exact time on the chart. These contacts are supported by the plate 173 and are operated by joint action of a cam follower 187 (Fig. 13) pivoted at 188 to plate 173 and a three-arm cam follower 189 pivoted at 190 to cam follower 187. A spring 191 secured to one arm of cam follower 189 and to plate 173 normally holds both cam followers in contact with cam 176. One arm of cam follower 189 has an insulating disk 192 which underlies one of the contacts MIC. The extreme right-hand end of cam follower 189 does not extend quite as far to the right as the cam follower 187 as shown by the broken line in Fig. 13. As cam 176 turns in a clockwise direction in said figure, it is plain that cam follower 189 will drop into the dwell in cam 176 before the cam follower 187 thus permitting spring 191 to rock cam follower 189 clockwise lifting disk 192 and forcing contacts MIC to close. Subsequently, cam follower 187 will drop into the dwell and spring 191 will rock said cam follower clockwise allowing disk 192 to drop thus permitting contacts MIC to reopen. At this time cam follower 189 also is rocked slightly counterclockwise relative to cam follower 187. The contacts MIC are not materially affected by the cam 176 as long as both have the relationship of Fig. 13 as the simultaneous lifting of both cam followers merely cause disk 192 to travel in the arc of a circle whose center is at 188 immediately below contacts MIC so that the latter are moved but slightly except when the dwell in the cam causes relative movement between the cam followers.

The shaft 174 extends forwardly (to the left in Figs. 2 and 12) to a point above and rearwardly of shaft 118 where shaft 174 is journalled in a bracket 193 secured to frame 119. A gear 194 is secured at this point to shaft 174 and meshes with a gear 195 pivotally mounted on the bracket 193. The gear 195 meshes with a gear 196 fixed to shaft 118. The driving ratio of gears 194, 195, 196 is unity therefore shaft 174 will be driven at the constant rate of one revolution per minute whenever motor DCM is in operation.

Normally motor ACM drives the cam 176 but an interruption in the supply of current to said motor causes clutch magnet CM to become deenergized whereupon spring 184, through shifter 178 causes the assembly comprising clutch elements 169a, 175a and cam 176 to shift to the left (Fig. 12), disengaging elements 169, 169a and engaging elements 175, 175a. At the same time, clutch contacts CC close thereby energizing motor DCM (Fig. 7) which will then drive cam 176 at the same speed as motor ACM drove it, through gearing 194, 195, 196, shaft 174, and clutch elements 175, 175a. This driving connection to motor DCM will be maintained until the supply of alternating current to motor ACM is restored causing clutch magnet CM to reengage clutch elements 169, 169a.

Mechanism is provided for automatically feeding the inking ribbon 57 and is shown in detail in Figs. 1, 2, 20 and 21. Secured to the right hand side of frame 35 is a frame 197 which supports the ribbon feeding mechanism. Pivotally mounted on the front face of this frame 197 (Fig. 21) are two ribbon spools 198R and 198L, respectively, each spool being removably secured to a shaft 199 journalled in the frame 197. The rear ends of shaft 199 have secured thereto gears 200R and 200L (Fig. 20) by means of which said shafts and their spools may be driven.

The ribbon 57 is secured to each spool and from the right hand spool 198R (Figs. 1 and 21) the ribbon passes over a guide pulley 201 carried by frame 197; to the left across the top of the recorder over a pulley 202 carried by frame 36; downwardly to a pulley 203 on a shaft 204; thence to the right beneath type wheels 38 to 42 and type elements 66m, 66b; over a pulley 205 carried by a frame 206; and over a pulley 207 carried by frame 197, to the left hand spool 198L. Pulleys 203 and 205 are adapted to be moved forwardly for a purpose to be described later. For the time being it will be assumed that the last named pulleys are in their rearmost positions in which the front half (or left hand half, Figs. 2 and 6) of the ribbon 57 lies beneath the type faces of elements 66m, 66b and type wheels 38 to 41.

In order to prevent smudging of the chart 33 there is provided a ribbon guard 208 (Figs. 1 and 6) which extends across the recorder between frames 34 and 35 and between the ribbon 57 and chart 33. This guard has two rectangular openings, one opposite the type faces of elements 66m, 66b, and the other opposite the type faces of type wheels 38 to 42.

Journalled and slidably mounted on lugs 209 in frame 197 is a shaft 210 carrying gears 211R and 211L adapted to mesh with the corresponding gears 200R and 200L. Normally one or the other of the pairs of gears 200R, 211R and 200L, 211L is in meshing relation as in the case of the first named pair in Fig. 20. Secured to the center of shaft 209 is a ratchet 212, and rotatably mounted on shaft 210 adjacent said ratchet is an arm 213 connected by a link 214 to an arm 215 on a cross shaft 216 (see Fig. 2). The latter is journalled in lugs formed in frame 197 and secured to said shaft 216 is an arm 217 connected by a link 218 to an arm 219 secured to a shaft 220. The latter is journalled in frames 34, 35.

An arm 221 secured to shaft 220 has a slot embracing a pin 222 carried by an extension 223 of the plunger 60 of solenoid TPS (Figs. 1 and 4) Obviously links 214, 218 will be drawn downwardly each time the solenoid TPS is energized to draw up its plunger 60.

Arm 213 carries a feed pawl 224 operated by a spring 225 (Fig. 2) and each time link 214 is drawn downwardly by an operation of solenoid TPS the ratchet wheel 212, shaft 210 and one of the ribbon spools will be rotated a step thereby feeding the ribbon 57 an increment.

The shaft 210 is automatically shifted to reverse the feed by mechanism best shown in Figs. 20 and 21. Journalled in frame 197 beneath the shafts 199 are shafts 226 having secured thereto, in front of frame 197, arms 227 provided with rollers 228 bearing on the coils of ribbon 57 wound on the spools 198R, 198L. The rear ends of shafts 226 have secured thereto arms 229 (Fig. 20) secured to which are flat leaf springs 230. Pivoted at 231 to frame 197 are rock levers 232 each having lugs 233 one of which is pressed against the adjacent end of shaft 210 by contact of leaf spring 230 with the other lug.

Each rock lever 232 has a bent over lug 234 adapted to cooperate with a locking notch 235 in a latch 236 pivoted at 237 to frame 197. The lugs 234 project into the planes of latches 236 and springs 238 anchored to lugs 209 cause the latches 236 to press on lugs 236. Arms 229 are interconnected by a spring 239 and have lugs 240 projecting into the planes of latches 236. The spring 239 constantly tends to rock shafts 226 in such fashion as to cause rollers 228 to press on the coils of ribbon on the spools 198R and 198L.

As the ribbon becomes wound or unwound from the spools, the arms 227, shafts 226, and arms 229 will be progressively rocked and lugs 240 will fall or rise according to whether the associated spool is winding or unwinding the ribbon. To prevent reverse movement of ratchet 212 there is secured to frame 197 a leaf spring 241 the free end of which engages the teeth of said ratchet.

Normally the notch 235 on the latch 236 of the spool which happens to be winding the ribbon is disengaged from its lug 234 as in the case of the latch for spool 198R in Fig. 20 while the notch 235 of the other latch 236 is engaged with its lug 234 as in the case of spool 198L in Fig. 20. Take the illustrative example of Figs. 20 and 21. As spool 198R winds the ribbon 57, arm 227 is gradually rocked counterclockwise (Fig. 21) thus rocking the associated arm 229 (the left hand one, Fig. 20) clockwise. This causes spring 230 to press arm 232 against the end of shaft 210 with increasing pressure as the spool 198R accumulates the ribbon. The arm 229 of spool 198L will also be rocked in a clockwise direction (Fig. 20) as said spool unwinds so that the pressure of spring 230 of spool 198L on the corresponding arm 232 is gradually lessened. No lengthwise movement of shaft 210 is permitted however, as the notch 235 in latch 236 of spool 198L at this time is securely holding its lug 234. Obviously lug 240 of the right-hand arm 229 in Fig. 20 will gradually rise as the ribbon becomes unwound from spool 198L and eventually, when the ribbon becomes nearly completely unwound from spool 198L, will lift latch 236, freeing notch 235 from lug 234, and permitting the left-hand leaf spring 230 to shift the upper end of left-hand lever 232 and shaft 210 to the right (Fig. 20) thereby meshing the gears 200L, 211 and demeshing gears 200R, 211R. At the same time lug 235 of the right-hand latch 236 associated with spool 198R will engage its lug 234 and hold the latch 236 and shaft 210 in shifted position.

The spool 198L will now be driven by shaft 210 and when this spool becomes full, the parts will be automatically shifted back to the position of Fig. 20 in exactly the same manner as described above.

Figure 9:
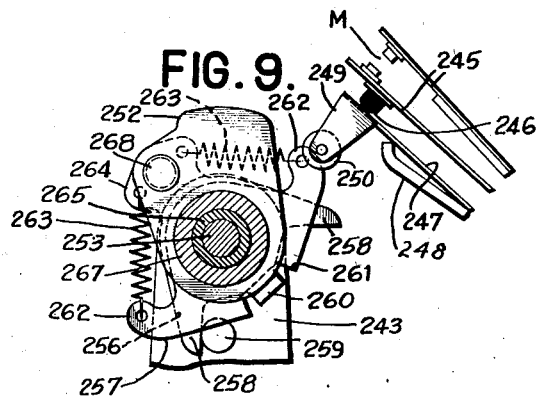
Fig. 9 is a vertical section on line 9—9 in Fig. 19.
Figure 18:
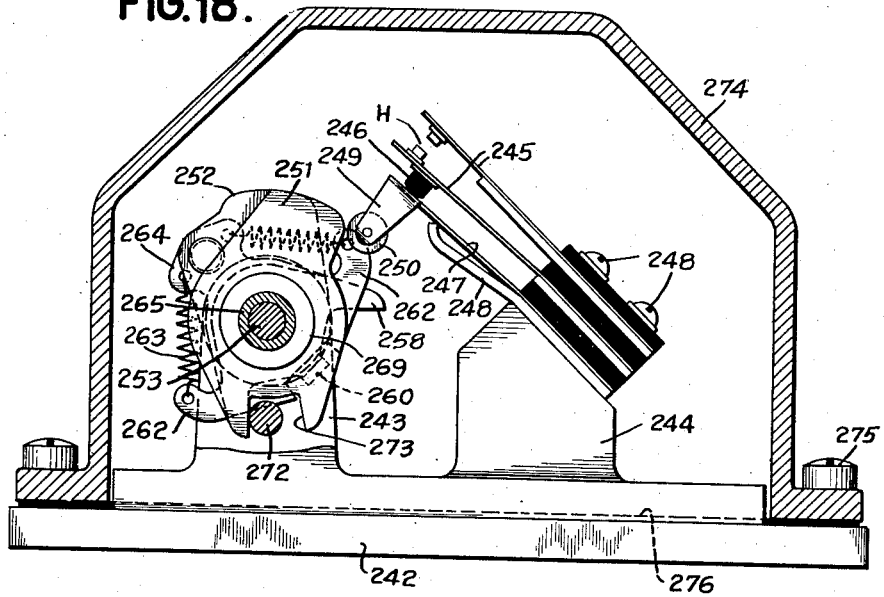
Fig. 18 is a vertical longitudinal section on the line 18—18 in Fig. 19 and illustrates the construction of one of the control switches which may be attached to a device whose operations are to be recorded.
Figure 19:
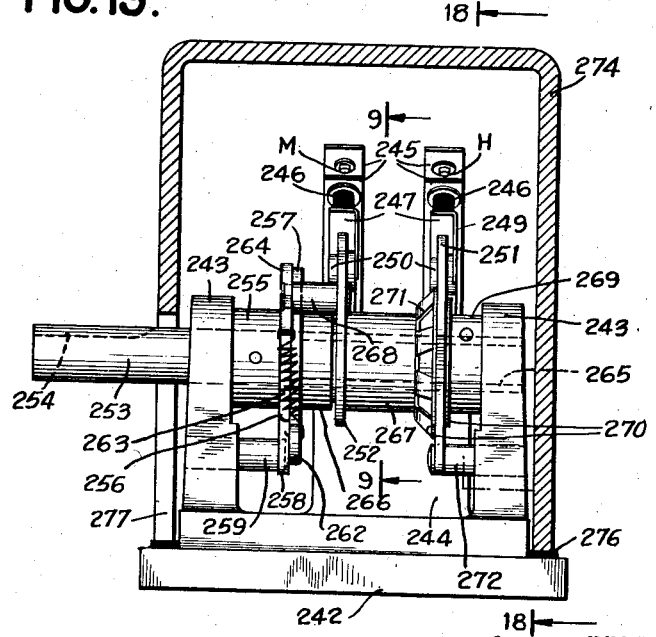
Fig. 19 is a transverse vertical section of the control switch shown in Fig. 18.

There is provided a control switch designed to be attached to each circuit breaker, device, machine, or apparatus whose operations are to be recorded on the chart 33. This switch is illustrated in Figs. 9, 18 and 19. As the service to which these switches are to be subjected is likely to be severe, they are purposely very ruggedly constructed and housed in a strong protective case capable of withstanding considerable abuse.

The mechanism of the switch is mounted on a one piece base casting 242 having two upstanding lugs 243 and a relatively wider lug 244 supporting two pairs of spring contact members designated H and M. These contacts will be termed the holding contacts and momentary contacts, respectively. Both pairs of contacts are alike in construction and differ only in the manner of their operation. Contacts H are carried by two flat spring members 245 insulatably mounted upon lug 244. One of them is slightly bent toward the left (Fig. 18) to provide a spring bias sufficient to separate the contacts H and has secured thereto a button 246 of insulating material which presses upon a leaf spring member 247 also mounted on lug 244 by means of the screws 248 securing members 245 to said lug. Member 247 is also slightly bent to the left to provide a spring bias like the member 245, and bears against a slightly curved stop strap 248 secured to lug 244 by screws 248. A bent-over lug 249 formed in member 247 carries a cam roller 250 adapted to cooperate with a cam 251 for operation by the latter.

The contacts M are similarly mounted and are adapted to be operated by a cam 252 having a shape different from that of cam 251. The cams 251, 252 are rocked in one direction or another, according to the operation of the device to which they may be connected by means of a shaft 253 journalled in the lugs 243. The left-hand end (Fig. 19) of this shaft is provided with a key-way 254 as a convenience in connecting shaft 253 to the device which operates it, a suitable arm keyed to said shaft being a likely type of connection.

Secured to shaft 253 is a hub 255 on a shoulder of which is loosely mounted a member 256 (Figs. 9 and 19) and secured to another shoulder on said hub is a member 257. The shoulder supporting member 257 is slightly smaller in diameter than the shoulder carrying member 256 and is directly to the right of member 256 (Fig. 19). Member 256 has two projections 258 adapted to engage a pin 259 carried by the left-hand lug 243. The projections 258 are so spaced that member 256 is capable of rocking an angular distance of 90° which movement is limited by pin 259. Member 256 also has a bent-over lug 260 (Fig. 9) projecting into a notch 261 formed in member 257 so that movement of members 256, 257 relative to each other is restricted by the width of the notch 261. Member 257 has two ears 262 on opposite sides of shaft 253 which ears are connected by springs 263 to a lug or arm 264 forming part of member 256. The springs 263 are balanced as to tension so that normally lug 260 has a position midway between the side walls of notch 261 as in Fig. 9. It is plain that, as long as clockwise rotation of shaft 253 is confined to an angular distance of 90° from the position of Fig. 9, the members 256, 257 will move as a unit a similar angular distance, and the lug 260 will remain in the center of notch 261. The same remarks apply to the case of counterclockwise movement of shaft 253 from a position where pin 259 is touching the upper or left hand projection 258.

Loosely mounted on shaft 253 between hub 255 and the right-hand lug 243 (Fig. 19) is a sleeve 265 which has an enlarged portion 266 adjacent hub 255 and, incidentally, is journalled in right-hand lug 243 and hence supports shaft 253. Loosely mounted on sleeve 265 adjacent the enlarged portion 266 is a hub 267 to which is secured cam 252. A pin 268, carried by arm 264 of member 257 projects into a hole in cam 252 so that the latter and member 257 move as a unit. Pinned to sleeve 265 adjacent the right-hand lug 243 is a collar 269. The cam 251 is loosely mounted upon sleeve 265 between two friction washers 270 and a friction spring 271 is interposed between hub 267 and the left-hand friction washer 270. The effect of friction spring 271 is to press hub 267 against the enlarged portion 266 of sleeve 265 and to press cam 251 against the right-hand friction washer 270 which, of course, in turn presses against collar 269. Obviously cam 251 is frictionally connected to members 256, 257 and tends to rotate with them but actual movement of cam 251 is limited by a pin 272 carried by right-hand lug 243 and projecting into a notch 273 in cam 251. The amount of angular displacement permitted cam 251 is, roughly speaking, about 15° but this angle may be varied within wide limits.

The profile of cam 251 is such that it is in advance of cam 252 when the parts are in the position of Fig. 18 and is adapted to operate upon roller 249 to close contacts H and hold them closed when the cam is rocked clockwise the full extent permitted by pin 272. Cam 252, on the other hand, has a profile such that contacts M are open at both the beginning and end of the 90° of movement of this cam permitted by pin 259 and are closed for a period of approximately 30°, roughly speaking, in the rotation of the cam. Figs. 9, 18 and 19 show the positions occupied by the various parts of the control switch when the circuit breaker, oil switch or similar device or apparatus is in closed circuit condition or in full operation as the case may be. This, of course, is a purely arbitrary arrangement.

When shaft 253 is rocked 90° in a clockwise direction (Figs. 9 and 18) as by the operation of a circuit breaker to open a circuit, the entire assembly on this shaft rotates as a unit with the shaft. The first 15° of movement of shaft 253 results in closure of contacts H by cam 251. The pin 272 then strikes the right side wall of notch 273 (Fig. 18) and prevents further movement of cam 251 in a clockwise direction. Cam 252, however, is still free to move and, during the next 30° of movement, first closes then reopens contacts M. At the end of 90° of movement contacts H will have been closed and contacts M opened, cam 252 will have been displaced 90°, while cam 251 will have been displaced 15° relative to cam 252.

The amount of the foregoing displacement of cam 251 relative to cam 252 is so designed that a counterclockwise movement of shaft 253 from the last described position, caused by operation of a circuit breaker or switch to close a circuit, will cause the roller 250 of cam 251 to drop into the dwell of said cam before cam 252 is operative to close contacts M. In other words, in the case of counterclockwise movement of shaft 253, the first 15° of movement results in opening contacts H, then the contacts M are closed and reopened and cam 251 displaced relative to cam 251 back to the position of Fig. 18 during the next 30° of movement. The remaining 15° of movement in both cases are idle.

The springs 263 provide a flexible connection between members 256, 257 which permits shaft 253 to turn slightly more than 90° in either direction before lug 260 strikes either the wall of notch 261 and positively prevents further rotation of shaft 253. The springs thus act both to correct for slight misadjustment straining of the linkages connected to shaft 253 and to absorb shocks. The springs 263 have no effect on the relation of cams 251, 252 to each other as the pins 259, 272 and notches 261, 273 fix this relation.

In order to exclude dust and moisture as much as possible, the switch described above is protected by a removable cover 274 secured to the base 242 by means of screws 275, a gasket 276 interposed between the cover 274 and base 242 providing a moisture and dust-proof seal. A close fitting slot 277 in cover 274 permits the removal of the cover without disturbing shaft 253. This slot may be closed by a dust and moisture-proof cover, if desired.

Figure 11:
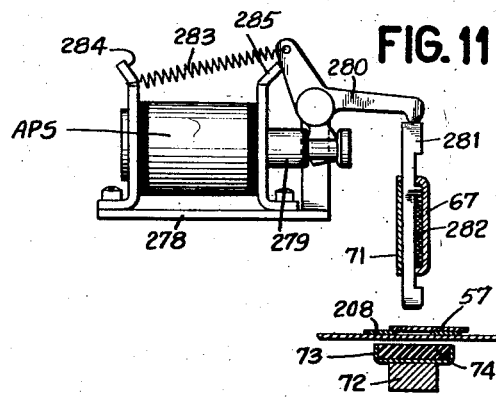
Fig. 11 is a vertical section on line 11—11 in Fig. 1.

Means is provided to print opposite each line of impressions from the row of type elements 66m, 66b, an arrow or other special sign which indicates the first impression made on each predetermined length of chart, in other words, marks off or delineates an entry which is made simultaneously with the initiation of operation of the chart feeding mechanism. This mechanism is operated by a solenoid APS (Figs. 1 to 3, and 11) hereinafter to be termed the "arrow print solenoid". Solenoid APS is mounted upon a plate 278 secured to frame 37. The plunger 279 of this solenoid is provided at its rear end with a circular groove into which loosely extends one arm of a three arm lever 280 pivoted on an extension of plate 278 (Fig. 11). Another arm of lever 280 extends rearwardly over the head of a type element 281 like type elements 66m, 66b and similarly mounted in frame 67 and plate 71. A spring 282 normally presses type element 281 upwardly, this construction being the same as that of elements 66m, 66b. The type element 281 has a type character on its lower end capable of printing the bent arrows shown in Fig. 5 and is located slightly to the left (Figs. 1 and 3) of the extreme left-hand type element 66m. A spring 283, anchored to a lug 284 in the frame of solenoid APS and attached to the third arm of lever 280 normally holds said arm against a lug 285 in the frame of the solenoid.

Obviously energization of solenoid APS will result in lever 280 rocking counterclockwise (Fig. 11) to force type element 282 downwardly into contact with the inking ribbon 57 thus making the impression of a bent arrow alongside and in line with the impressions of type elements 66m, 66b as in Fig. 5. The arrow printing solenoid is operated only when the initial entry is made on each predetermined length of chart and is controlled in a manner to be explained hereinafter.

Means are also provided to cause the operation of the recorder when the case 31 is removed for any reason which means is so arranged that the records made under such circumstances are in a color sharply contrasting with the records made during normal operation. Figs. 1, 2, 4, and 21 best illustrate the above means. The ribbon 57 is a two-color ribbon of conventional form in which the left-hand or front half of the ribbon (see Fig. 6) may be charged with blue ink while the right-hand or rear half may be charged with red ink. Normally the front or blue half of the ribbon is beneath the faces of the types at the printing line but removal of the case 31 is designed to cause the ribbon 57 to shift to the left (Figs. 2 and 4) to bring the rear half of the ribbon under the type faces. For this purpose the ribbon guide pulley 203 is rotatably mounted on a rod or shaft 204 but cannot slide on said shaft. The latter is slidably mounted in brackets 286, 287 secured to the left-hand side of frame 36 and has a head 288 secured thereto which is pressed against the glass 32 by a coil spring 289 (Fig. 4) interposed between head 288 and bracket 286.

The pulley 205 is rotatably mounted on a frame 206 (Fig. 21) which in turn is mounted on a shaft 290 by means of suitable ears in the frame 206 through which passes the shaft 290. The latter has a head 291, similar to head 288, and is slidably mounted in a frame 292 secured to frame 197. A spring 293 (Fig. 2) interposed between head 291 and the frame 292 normally presses head 291 against glass 32. Frame 206 is constrained to move with shaft 290 when spring 293 pushes the latter to the left and said frame is kept in a horizontal position by a pin 294 (Fig. 21) of suitable length secured to frame 197 and fitting loosely in a hole in frame 206.

It is plain that when the cabinet 32 is removed the springs 289, 293 will push shafts 204, 290 to the left drawing with them the ribbon pulleys 203, 205 and causing the ribbon 57 to shift to the left (Figs. 2, 3, 4, 6 and 11) to bring the red portion over the printing line.

Secured to a lug 295 formed in frame 292 (Fig. 21) is a bracket 296 on which are mounted two pairs of contacts C1, C2 insulated from each other and bracket 296. Slidably mounted in frame 292 is a rod 297 (Figs. 1, 2, and 21) to which is secured a cam block 298 of insulating material adapted to cooperate with buttons 299 of insulating material secured to one of each pair of contacts C1, C2. Rod 290 also passes through block 298. A spring 300 (Fig. 2), interposed between block 298 and the rear part of frame 292 presses block 298 and shaft 297 to the left (Fig. 2) so that the end of said shaft is kept in contact with the glass 32. Block 298, when the cabinet is in place, has a position to the right of buttons 299 (Fig. 2) but when the cabinet is removed moves to the left past buttons 299, which it cams to the right (Fig. 1) closing contacts C1, C2 momentarily, and assumes a position forwardly (to the left Fig. 2) of said buttons. Thus contacts C1, C2 are closed momentarily each time the cabinet is removed.

In order to wind the chart 33 on the storage spool 51 and keep the chart taut after it leaves drum 50 there is provided a belt and pulley drive comprising a pulley 301 secured to spool 51, a belt 302, and a pulley 303 secured to a gear 304 and journalled on a stud carried by frame 35. Gear 304 meshes with pinion 121 and the driving ratios of the pulleys 301, 303 and gears 121, 304 are such that the spool has a tendency to overwind, slippage between belt 302 and pulleys 301, 303 permitting such operation without danger of tearing the chart.

The various mechanisms and elements of an illustrative embodiment of the invention having been described in considerable detail, the general operation of the invention will now be described with reference to the wiring diagram in Fig. 7 and the fragments of the chart illustrated in Fig. 5.

It will be assumed that the operations, both supervisory and automatic, of ten circuit breakers and oil switches are to be recorded and that each is provided with a control switch like the one illustrated in Figs. 9, 18 and 19. The holding contacts of these oil switches and circuit breakers are designated H1, H2, ... H9, H10 in Fig. 7 and the corresponding momentary contacts and interposer magnets will be designated M1, M2, ... M9, M10, and IM1, IM2, ... IM9, IM10. Interposer magnets IM1, IM2, etc. are in series with the corresponding holding contacts H1, H2, etc. across line wires W3, W4 leading to a battery B or suitable source of direct current.

When any oil switch or circuit breaker is in closed position, its control switch will be in the closed condition shown in Figs. 9, 18, and 19. It will be assumed further that initially all the oil switches and circuit breakers are in closed condition in a network which is in full operation, with the exception that circuit breaker No. 10 is in open condition but is about to be closed. Under these circumstances the interposer magnets of all the circuit breakers save that of No. 10 will be deenergized and the interposers left-hand nine interposers (Fig. 1) are over the types 66m corresponding to the vertical columns numbered 1 to 9 in Fig. 5. The control switch of circuit breaker No. 10 will have its momentary contacts M10 in open position and its holding contacts H10 in closed position so that the interposer associated with interposer magnet IM10 will be over the associated type element 66b which is the extreme right-hand element in Figs. 1 and 6.

The motor ACM is assumed to be in full operation causing the minute impulse contacts MIC to close once each minute immediately after the 60th second. Thus type wheel 39 is being stepped forward once each minute and type wheels 38, 39 together are registering correct time to the minute. Motor DCM will be inactive under these conditions as contacts MD1 and CC are open.

If now circuit breaker No. 10 is operated to close its circuit, its control switch holding contacts H10 will open during the first 15° of counterclockwise movement of shaft 253 (Fig. 18) deenergizing interposer magnet IM10 and permitting its interposer 75 to swing to the left over the extreme right-hand type element 66m (Figs. 1 and 6).

During the remainder of the counterclockwise movement of shaft 253 contacts M10 will be closed momentarily. This will establish circuits as follows: Positive line wire W3, relay R1, and momentary contacts M10, to negative line wire W4. Another circuit extends from line wire W3, contacts MD3, arrow print solenoid APS, and contacts M10, to line wire W4. This causes the bent arrow to be immediatley printed on the chart as in the case of the bottom line in Fig. 5. Relay R1 closes both its contacts to energize both starting magnet SM and make and break printing solenoid MBP. Energization of the starting magnet SM initiates one cycle of operation of the chart feeding mechanism, as described before herein, by disengaging lever 129 from arm 128 and the chart begins to feed at the prescribed uniform rate of speed. Magnet SM, in deenergizing, operates contacts MD1, MD2, MD3, so that MD3 opens and MD1, MD2, close. The make and break printing solenoid MBP operates as described to force all the type elements 66m downwardly thus completing the lowest entry in Fig. 5. The opening of contacts M10 almost immediately deenergizes relay R1 and the solenoid MBP while the opening of contacts MD3 prevents further operation of the arrow print solenoid while the chart is being fed. Closure of contacts MD1 (which takes place practically simultaneously with release of lever 128 from dog 127) causes motor DCM to start.

The chart now begins feeding at a uniform rate of speed and will stop after one and one-half inches have been fed which will require one full minute of time. About twenty seconds after the initiation of the chart feed and the initial entry on the chart (as determined by measuring the distance between the first and second entries in Fig. 5) circuit breakers Nos. 1, 3, 8 and 10 are opened whereby the operation of their control switches causes contacts H1, H3, H8 and H10 to close energizing the corresponding interposer magnets which effect shifting of the corresponding interposers over the related type elements 66b.

Next, momentary contacts M1, M3, M8 and M10 all close momentarily (closure of only one is necessary, however) and this energizes relay R1 and solenoid APS as before. Virtually the same events take place as in the case of the first entry in Fig. 5 but energization of magnet SM has no effect this time as the lever 127 has already engaged ratchet wheel 120 and has been moved nearly one third of the way around shaft 118 and the minute duration contacts have already been operated. Arrow print solenoid APS cannot be energized as contacts MD3 are now open. The operation of solenoid MBP will cause the second entry from the bottom (Fig. 5) to be made. About seven seconds after the second entry, those circuit breakers which were opened and caused the making of the second entry were reclosed causing a third entry to be made showing that all ten circuit breakers and oil switches are now closed.

As the third entry is made at exactly 2.27 P. M., contacts MIC close practically simultaneously with the operation of the circuit breakers and additional circuits are established as follows: Line wire W3, contacts MD2, relay R2, and contacts MIC to line wire W4. Line wire W3, time printing solenoid TPS, and contacts of relay R2, to line wire W4. The operation of solenoid TPS causes the exact time in hours and minutes and the straight arrow to be printed on the chart, as in the lower left-hand corner in line with the third entry in columns 1 to 10 of the fragment of chart in Fig. 5, together with the date.

About five seconds after the third entry, a fourth entry is caused by the opening of circuit breaker No. 5 and about twenty-eight seconds after the fourth entry, near the end of the first paper feed cycle, a fifth entry is made when circuit breaker No. 5 is reclosed.

The stopping of the paper feed is caused by the arm 128 (Fig. 14) being engaged by arm 129 which restores the parts to the position shown in this figure, disconnecting ratchet 120 from arm 25 and at the same time contacts MD1, MD2 are opened and MD3 reclosed by the engagement of cam lug 147 with arm 148, as described before, thus breaking the circuit to motor DCM which then stops.

It is plain that any desired number of entries can be made during the course of a chart feeding cycle and that the exact time to the minute is printed on each predetermined length of chart to provide a reference point by means of which the exact time of the other entries on said length of chart may be easily determined by a suitable ruler or scale graduated in fortieths of an inch. The bent arrow adjacent the first entry in columns 1 to 10 on each predetermined length of chart provides a means for determining which time entry belongs to a group of entries in columns 1 to 10 indicating changes in the status of the circuit breakers, as the first time entry above a bent arrow belongs with the entries above and including the one adjacent said arrow, which may be comprised in a strip one and one-half inches wide measured in a direction opposite to the direction of feed. Thus the time entry 6.01 P. M. belongs with the two entries between the second and third bent arrows from the bottom of Fig. 5. The time print entries 6.01 P. M. and 6.02 P. M. are exactly one and one-half inches apart as they are consecutively made entries resulting from two successive cycles of chart feed with no interval of time between.

Obviously the time print entry is likely to be made at any point and only accidentally coincides with the entries in columns 1 to 10.

In case the alternating current supply to motor ACM is interrupted causing clutch contacts CC to close, motor DCM will not stop when contacts MD1 open at the end of a chart feed cycle but the chart will come to rest, nevertheless, as the long tail of lever 127 (Fig. 14) will strike pin 132 and positively prevent feeding of the chart after arm 128 has engaged arm 129. The minute impulse contacts MIC will thus continue to function at one minute intervals to operate magnet TM.

The entry below the highest entry shown in Fig. 5 is one which has been made in red ink as a result of removal of the case 32 to insert a new chart. When this is done, the ribbon 57 is shifted as described and at the same time contacts C1, C2 are momentarily closed by cam block 298. Circuits are established by these contacts as follows: Line wire W3, time printing solenoid TPS, and contacts C1 to line wire W4, thus causing the time to be printed to the nearest minute. Wire W3, make and break printing solenoid MBP, and contacts C2, to line wire W4 thus causing the printing of a row of characters from type elements 66m, 66b to show the status of the circuit breakers and oil switches at the time the case was removed. The bent arrow is not printed in this case as solenoid APS is controlled only by actual operation of a circuit breaker or oil switch. The absence of this bent arrow and the fact that the entries at this time are made in red ink indicates the fact that the case was removed. When the case is replaced contacts C1, C2 are again operated and a second entry is made, the highest in Fig. 5, in exactly the same fashion.

If any changes in the status of the circuit breakers and oil switches have occurred while the operator is inserting a new chart, as while he is placing a new supply spool in the recorder, these changes will, to a certain extent, at least, be indicated on the chart when the case is replaced. Thus, the highest entry in Fig. 5 shows that circuit breaker No. 3 opened during the interval when the chart was being changed. This feature is extremely valuable, as showing not only the length of time the recorder was not in active use to permit replacement of the chart, but gives an initial entry to show the status of the breakers between the time of the changing of the chart and the first entry resulting from the operation of one or more circuit breakers.

For instance, if the second red ink entry were absent, a circuit breaker might change its status after the case was removed and before it was replaced and a subsequent blue ink entry would show this change but it would not be distinguishable from the changes which caused the blue ink entry. Thus a breaker might be open or closed for hours before a change in another breaker would cause an entry to be made on the chart and both changes would appear to have been made at the same time.

The second red ink entry is obviously a valuable feature as it fills in a possible gap in the history of operations of the breakers which gap, if present, might prove serious in many easily imaginable circumstances such as demands on the power company for refunds, accident negligence suits, and so on.

It is conceivable that two operations of a circuit breaker or other apparatus connected to the recorder may occur in such close succession that the entries overlap more or less. This is of no importance as far as the utility of the record is concerned as at least one column will show non-overlapping imprints. To illustrate, assume that the third and fourth registrations from the bottom on the right hand half of the chart (Fig. 5) overlapped, in other words, circuit breaker No. 5 reopened immediately after circuit breaker No. 1 was closed. The "M" imprints in columns 1 to 4, and 6 to 10, would all be repeats and easily distinguishable since it is impossible for an "M"

imprint to occur over a "B" imprint. The "M" imprint for circuit breaker No. 5 would stand by itself in column 5 and would be displaced below the "B" imprint by a distance easily measurable with a scale.

It is desired to point out that in the majority of the applications of a recorder of the type described herein it will be unlikely that any single machine or apparatus could be operated twice in the same way in such close succession as to have two similar overlapping entries indistinguishably appear on the chart. Circuit breakers, for example, even if they are of the high speed automatic reclosing type do not reclose immediately but are timed to remain open for periods ranging from several seconds before reclosing in order to allow sufficient time for short circuits, overloads, and so on, to clear. Similarly most machinery takes an appreciable time, at best several seconds, to restart or stop as the case may be. It is possible, however, for two different machines or apparatus to be started in operation and/or stopped in such close succession as to be almost indistinguishable on the chart. For practical purposes, this condition would be regarded as simultaneous so far as the time is involved. The actual order in which machine operations occurred is easily determinable, in the case of overlapping registrations, by examining the entries immediately preceding or following the two in question.

The magnet TM and solenoid TPS are practically simultaneously operated when minute impulse contacts MIC close during a chart feeding cycle. As magnet TM does not directly actuate the type wheels 38 but, instead actuates an arm against the tension of a spring and the spring, upon deenergization of magnet TM, advances the minutes type wheel 38 by means of a pawl on the arm as in Patent No. 1,798,583. In other words, if the type wheels 38 indicated 7.59 and the 60th minute impulse were received by magnet TM and solenoid TPS together the time printed on the chart would be 7.59 instead of 8.00 the correct time as magnet TM would not directly advance the minutes type wheel 38 and it would continue to stand at 59 until magnet TM and solenoid TPS both became deenergized. This would introduce an error in the time print entries if permitted to exist but may be corrected very easily by shifting the minutes type wheel relative to hands 43 of the clock movement whereby the minutes type wheel is always one minute in advance of the time indicated by hands 43.

An important feature of the invention is that expensive ruled charts can be dispensed with and rolls of unprinted paper having only the sprocket holes may be used. Indeed, even the sprocket holes can be eliminated by adding a pressure roll between which and the drum 50 the unperforated strip passes. The fact that charts which are not ruled and printed to show the hours of the day may be used is an added advantage as the chart does not have to be positioned accurately with respect to the recording mechanism, as is the case when charts having the hours of the day, both A. M. and P. M., printed thereon with suitable, accurately spaced ruled lines, are used.

Another feature is the economy of current and absence of drain on the battery which results from the method of control of the recorder. Since it is most likely that machines, apparatus, or devices connected to the recorder will be in operation or active more frequently than inactive, particularly in the case of circuit breakers and oil switches, the only current consumed by the recorder is the few watts required by the motor ACM and the circuit to magnet TM plus the relatively small amount of current consumed by such few interposer magnets as may be kept in energized position by the relatively few circuit breakers or other devices in open or inactive position.

Obviously the recorder can be used for recording the time of starting and stopping or changes in operating condition of almost any kind of machine, device, or apparatus, only a few of its applications having been given herein.

The recorder is especially suitable for use in recording the operation of machines, devices, or apparatus whose very high cost and great size demand that they be kept in service with as few interruptions for necessary repairs, adjustments, or inspection as possible in order to secure a maximum return on the investment. This is particularly true of paper making machinery, large turbo-electric power generators, rolling mills, and certain kinds of automatic production machines which are bulky and costly, to mention only a few. In the case of such bulky and costly machinery, it is absolutely necessary that accurate and reliable records be kept of their operations.

The fact that the chart is fed only when changes take place in operating conditions makes it unnecessary to scan many feet of chart to locate and examine the relatively few parts that show changes of interest. This results in a saving of time, a more easily studied record, an economy of chart, and a record which is accurate and comparative throughout the length of the chart.

Parts of the chart can be cut off and unmoved as desired and, owing to the dual records made when the case is removed can be filed in flat, easily stored condition. Such a file will show a continuous history of operations, easily traced and checked, and difficult to falsify. The rolls of used chart thus need not be preserved in continuous form in rolls or accordion folded packs, as is the present custom with common types of graphic recorders but can be removed from the recorder in convenient lengths each of which has at its beginning and end a record made when the case was removed to preserve the continuity of the record.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A time recorder comprising a selective printing device, means operable in cycles for feeding a chart to said device and adapted to feed a predetermined length of chart in a predetermined interval of time, a driving motor adapted to operate said feeding means at a constant rate of speed, and selectively operable switching devices adapted when operated to initiate operation of the feeding device and selectively controlling the printing device.

2. A recorder having a printing device adapted to make registrations on a chart, means to cause the printing device to operate, a cyclically operable chart feeding device adapted to feed in one cycle a predetermined length of chart past said printing device, the length of feed being sufficient to permit several irregularly spaced registrations to be made on the chart, means for driving the chart feeding device at a constant rate, means for initiating operation of the driving means, a time printing device effective while the chart is being fed to print exact time at least once in each predetermined length of chart, and means controlled by the initiating means for printing on the chart adjacent the first registration a special sign to identify the first registration.

3. A chart recorder having time printing mechanism and item printing mechanism including a multi-color ribbon shiftable to cause imprints by said mechanisms to be made in either of two colors on the chart, a case enclosing said mechanism, means controlled by the case for shifting the ribbon when the case is removed whereby imprints made on the chart after the case has been removed are made in a color different from those made while the case is in place and means responsive to case removal for causing an operation of both printing mechanisms when the case is removed or replaced.

4. A chart recorder comprising printing mechanism adapted to make imprints on the chart; two color inking means for the printing mechanism whereby impressions of the printing mechanism on the chart are made in either of two colors; a color selecting device, a case enclosing the printing mechanism, inking means, and color selecting means, said case controlling the color selecting means to cause imprints made on the chart while the case is in place to be made in a color different from imprints made while the case is removed; and means responsive to removal of the case for causing an operation of the printing mechanism.

5. A time recorder comprising time recording elements; means for advancing said elements at periodic intervals including an electromechanical device for operating the advancing means, a source of current, and a switching device for periodically energizing the electromechanical device; an alternating current motor adapted to operate the switching device at a constant rate of speed, a constant speed direct current motor also adapted to operate the switching device at a constant rate of speed, a selective clutch device normally operatively coupling one of the motors to the switching device but adapted when actuated to couple the other motor to the switching device, and means controlled by the current to the normally coupled motor for actuating the clutch device.

6. In a time recorder having paper feed mechanism and a time stamp movement; the combination of a pair of drive motors, one having connections for actuating the paper feed mechanism and operated from one source of current, the other having connections to cause periodic operation of the time stamp movement, and operated from a different source of current; and a device controlled by the current to the second motor for disconnecting the latter from the time stamp movement and connecting the time stamp movement to the first motor when the current to the second motor is interrupted whereby to prevent an interruption in the operation of the recorder as a unit.

7. In a recorder of the class described, a plurality of types arranged in pairs, a series of type selecting magnets each associated with a pair of types, type operating hammers one for each type, means for operating said hammers in unison including an actuating solenoid; a series of hammer control interposers each corresponding to a selecting magnet and operated thereby, said magnets selectively moving the associated interposer from a position between one type of a pair and its hammer to a position between the other type element and its hammer; and means for controlling said magnets selectively, said means also causing operation of the solenoid each time a selecting magnet is operated.

8. In a recorder of the class described; a series of type elements arranged in pairs, a rockable frame; type hammers mounted in said frame, there being a type hammer for each type element; a series of hammer control interposers, one for each pair of type elements, each interposer being movable to a position between one type element and its hammer or to an alternate position between the other type element and its hammer; a solenoid for operating said frame to cause the hammers to move toward the type elements; a magnet for each interposer, said magnets being adapted to selectively position the interposers between the hammers and type elements, means for selectively operating the magnets, and means for operating said solenoid as an incident to each operation of a magnet.

9. In a recorder of the type described, a pair of type elements each manifesting a different operating condition of apparatus, hammer mechanism for said elements, a pivoted interposer for selectively controlling the effect of the hammer mechanism on the type elements, a magnet operating said interposer, a magnet for operating the hammer mechanism, apparatus controlled means for causing operation of the first magnet according to the operating condition of the apparatus, and means controlled by the last named means for operating the second magnet.

10. A recorder for transient phenomena comprising a series of printing devices and means to operate said devices in accordance with the occurrence of transient phenomena, a chart feeding device for feeding fixed lengths of chart past said series of devices to receive entries from said series of devices, means responsive to transient phenomena for initiating operation of the feeding device, time recording means arranged to record time on the chart, a timing device tending to cause operation of the time recording device at regular time intervals, and means connected to the chart feeding means for disconnecting the timing device from the time printing device except when the chart is being fed.

11. A recorder comprising chart feeding means operable in cycles to feed a predetermined length of chart at a uniform speed, recording devices for making successive registrations on the chart, control means for controlling the operation of the recording devices and including means to initiate a cycle of the feeding means, means to suppress operation of the initiating means after said cycle commences and for the duration of said cycle, a time recording device arranged to record time on each length of chart, operating means for the time recording device, means tending to cause a regular operation of the operating means at intervals not greater than the period of a chart feeding cycle, and means controlled by the feeding means for preventing operation of the operating means except while the chart feeding means is in operation.

12. A recorder comprising recording mechanism having a series of selectively actuable recording elements, means to operate said elements, a chart feeding device operable in cycles to feed a chart to the recording mechanism by increments materially greater than is necessary for a single registration by one of said elements whereby more than one registration may be made on the length of chart fed during a single cycle, means to selectively control operation of said elements by the operating means including means to initiate a cycle of the chart feeding device, means controlled by the initiating means for recording on the chart a special sign to designate the first registration on each length of chart, and means controlled by the feeding means for preventing operation of the special sign recording means after the first registration is made on each length of chart.

13. A recorder having a chart feeding device, a constant speed driving motor; a clutch connecting said driving motor to the feeding device, said clutch being so constructed and arranged as to cause the chart to be fed uniform increments of length and after each length is fed to disconnect the motor from the feeding device, said increments of length being large enough to permit a succession of registrations to be made during each cycle of the feeding device, selective recording mechanism, selective control means for causing operation of the recording mechanism including means to cause an operation of the clutch to initiate a cycle of the feeding means whereby to cause the chart to be advanced to positions to receive further registrations from the recording means during said cycle.

14. A chart recorder comprising a time recording device for recording time on the chart, chart feeding means, electric means to actuate said time recording device, a switching device arranged to cause the electric means to operate, means to actuate said switching device at regular intervals of time, an alternating current motor for driving said actuating means, a constant speed direct motor for driving the chart feeding means, a clutch normally connecting the actuating means to the alternating current motor, and operable to disconnect the actuating means from the alternating current motor and connect the actuating means to the main drive motor, and alternating current responsive means to control said clutch.

15. A recorder comprising recording mechanism including time recording means, means for recording other data, and means to identify the first registration made by the data recording means; cyclic means to feed a chart to said recording mechanism to receive registrations therefrom, said feeding means feeding a predetermined length of chart sufficient to permit a plurality of successive registrations to be made on the chart by the recording mechanism in a single cycle of operation of the feeding means; means to cause an operation of both the data recording mechanism and the identifying means, and also to initiate a cycle of the feeding means; means to prevent operation of the identifying means after the chart feed has commenced, and means to cause an operation of the time printing means after the chart feeding cycle commences.

16. A recorder comprising a pair of recording elements, means responsive to the occurrence of phenomena for selecting one or the other of said elements, means to operate the selected element; a cyclic chart feeding device adapted to feed at a constant speed past said elements a predetermined length of chart materially greater than is necessary for a single registration by the selected element, whereby to permit several records to be made by said elements during the course of said predetermined feed; means controlled by the first-named means for initiating operation of the feeding means, and means effective only while the chart feeding operation is taking place to print the exact time on each predetermined length of chart whereby to provide a time reference point for determining the time of making each record on the chart.

17. A recorder comprising recording mechanism, means responsive to transmit phenomena for selectively operating the recording mechanism, a chart feeding device adapted to feed in a single cycle of operation a predetermined length of chart materially greater than is necessary for a single recording by the recording mechanism whereby to permit a plurality of successive recordings to be made by the recording mechanism in response to transmit phenomena, means controlled by the first-named means for initiating a cycle of operation of the feeding device, a time recording device, and means to cause the time recording device to operate automatically during each cycle of the feeding means whereby to record the exact time on each predetermined length of chart to provide a time reference point for determining the exact time of each recording.

18. A recorder comprising a cyclically operable chart feeding device adapted to feed a predetermined length of chart during each cycle of said device, means for actuating the chart feeding device at a constant speed whereby directions on the chart along the line of feed represent coordinates of time, means responsive to transient phenomena for initiating actuation of the chart feeding device by the actuating means, a device for recording the exact time on each length of chart fed, and means operative while the chart is at rest for preventing operation of the recording means.

19. A chart recorder comprising a recording device with means to cause records to be made by said device on the chart in either of two colors, a color selecting device, a case enclosing the recording device and color selecting device, means responsive to removal or replacement of the case for controlling said selecting device to select the color in which records are to be made by the recording device, and means responsive to removal or replacement of the case for causing operation of the recording device.

20. A recorder comprising time recording means and item recording means, means to feed a predetermined length of record sheet to both said recording means to receive a succession of recording from the item recording means; means to cause operation of the item recording means and operative, when the initial recording of a succession is made, to initiate operation of the feeding means; means for causing operation of the time recording mechanism at predetermined times, and means operated by the feeding means for rendering the last-named means effective only while the record sheet is being fed.

LAURENCE S. HARRISON.